US012659346B2

(12) United States Patent　(10) Patent No.: US 12,659,346 B2

Gleitz　(45) Date of Patent: Jun. 16, 2026

(54) DEVICES, SYSTEMS, AND METHODS FOR IDENTIFYING CYBER ASSETS AND GENERATING CYBER RISK MITIGATION ACTIONS BASED ON DOMAIN REDIRECTS

(71) Applicant: BlueVoyant LLC, New York, NY (US)

(72) Inventor: Peter Gleitz, New York, NY (US)

(73) Assignee: BlueVoyant LLC, New York, NY (US)

( * ) Notice: Subject to any disclaimer, the term of this patent is extended or adjusted under 35 U.S.C. 154(b) by 48 days.

(21) Appl. No.: 18/840,868

(22) PCT Filed: Feb. 20, 2023

(86) PCT No.: PCT/US2023/062894

§ 371 (c)(1),
(2) Date: Aug. 22, 2024

(87) PCT Pub. No.: WO2023/164416

PCT Pub. Date: Aug. 31, 2023

(65) Prior Publication Data

US 2025/0184350 A1　Jun. 5, 2025

Related U.S. Application Data

(60) Provisional application No. 63/313,422, filed on Feb. 24, 2022.

(51) Int. Cl.
H04L 9/40　(2022.01)
(52) U.S. Cl.
CPC ...... H04L 63/1441 (2013.01); H04L 63/1433 (2013.01)
(58) Field of Classification Search
CPC ............. H04L 63/1441; H04L 63/1433; H04L 63/1483; H04L 61/4511; G06F 21/554; G06F 21/577
See application file for complete search history.

(56) References Cited

U.S. PATENT DOCUMENTS 9,026,507 B2 * 5/2015 Shraim ............... H04L 63/1491
707/697
10,834,127 B1 11/2020 Yeh et al.
(Continued)

FOREIGN PATENT DOCUMENTS

WO　2023164416 A1　8/2023

OTHER PUBLICATIONS

International Search Report and Written Opinion for corresponding International PCT Application No. PCT/US2023/062894, dated Jul. 18, 2023.

(Continued)

*Primary Examiner* — Sm A Rahman
(74) *Attorney, Agent, or Firm* — K&L Gates LLP

(57)　ABSTRACT

A method for identifying cyber assets and implementing cyber risk mitigation actions based on domain redirects is disclosed. The method comprising selecting an entity for evaluation; identifying one or more seed domains of the entity; identifying candidate domains based on at least one of a public data source, a proprietary data source, or a combination thereof; fetching the candidate domains to determine routing information for each of the candidate domains; classifying, based on the routing information, each candidate domain that redirects to the one or more seed domains as an associated domain, wherein each associated domain is considered to be an asset of entity; generating an entity asset database based on the one or more seed domains and the associated domains; and generating a cyber risk mitigation action based on the entity asset database.

32 Claims, 8 Drawing Sheets

(56) References Cited

U.S. PATENT DOCUMENTS

| | | |
|---|---|---|
| 2003/0009696 A1 | 1/2003 | Bunker V. et al. |
| 2009/0064330 A1* | 3/2009 | Shraim ............... H04L 63/1441 |
| | | 726/22 |
| 2009/0119402 A1 | 5/2009 | Shull et al. |
| 2012/0047180 A1 | 2/2012 | Kirshenbaum |
| 2012/0084860 A1 | 4/2012 | Cao et al. |
| 2017/0048267 A1 | 2/2017 | Yampolskiy et al. |
| 2017/0236079 A1 | 8/2017 | Venna et al. |
| 2019/0141077 A1* | 5/2019 | Tyler ..................... G06F 21/606 |
| 2022/0261714 A1* | 8/2022 | Aslam .................... H04L 41/22 |
| 2022/0278997 A1* | 9/2022 | Jeyakumar ........... G06F 16/951 |

OTHER PUBLICATIONS

Extended European Search Report for corresponding European Application No. 23760831.0 mailed on Feb. 6, 2026.

* cited by examiner

DEVICES, SYSTEMS, AND METHODS FOR IDENTIFYING CYBER ASSETS AND GENERATING CYBER RISK MITIGATION ACTIONS BASED ON DOMAIN REDIRECTS

CROSS-REFERENCE TO RELATED APPLICATIONS

The present application is related to U.S. Provisional Patent Application Ser. No. 63/313,422, titled DEVICES, SYSTEMS, AND METHODS FOR IDENTIFYING CYBER ASSETS AND GENERATING CYBER RISK MITIGATION ACTIONS BASED ON DOMAIN REDI-RECTS filed Feb. 24, 2022, the disclosure of which is hereby incorporated by reference in its entirety.

FIELD

The present disclosure is generally related to network security, and, more particularly, is directed to improved devices, systems, and methods for identifying cyber assets and implementing cyber risk mitigation actions based on domain redirects.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method for identifying cyber assets and generating cyber risk mitigation actions is disclosed. In one aspect, the method comprises selecting, by a processor, an entity for evaluation; identifying, by the processor, one or more seed domains of the entity; identifying candidate domains based on at least one of a public data source, a proprietary data source, or a combination thereof; fetching, by the processor, the candidate domains to determine routing information for each of the candidate domains; classifying, by the processor, based on the routing information, each candidate domain that redirects to the one or more seed domains as an associated domain, wherein each associated domain is considered to be an asset of entity; generating, by the processor, an entity asset database based on the one or more seed domains and the associated domains; and generating, by the processor, a cyber risk mitigation action based on the entity asset database.

In various aspects, a non-transitory computer readable storage medium comprises instructions, executable by a processor, to select an entity for evaluation; identify one or more seed domains of the entity; generate a list of candidate domains based on at least one of a public data source, a proprietary data source, or a combination thereof; fetch the candidate domains to determine routing information for each of the candidate domains; classify, based on the routing information, each candidate domain that redirects to the one or more seed domains as an associated domain, wherein each associated domain is considered to be an asset of entity; generate an entity asset database based on the one or more seed domains and the associated domains; and generate a cyber risk mitigation action based on the entity asset database.

These, and other objects, features, and characteristics of the present disclosure, as well as the methods of operation, and functions of the related elements of structure, and the combination of parts, and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration, and description only, and are not intended as a definition of the limits of the disclosure.

BRIEF DESCRIPTION OF THE DRAWINGS

Various features of the aspects described herein are set forth with particularity in the appended claims. The various aspects, however, both as to organization, and methods of operation, together with advantages thereof, may be understood in accordance with the following description taken in conjunction with the accompanying drawings as follows:

Figure 1:
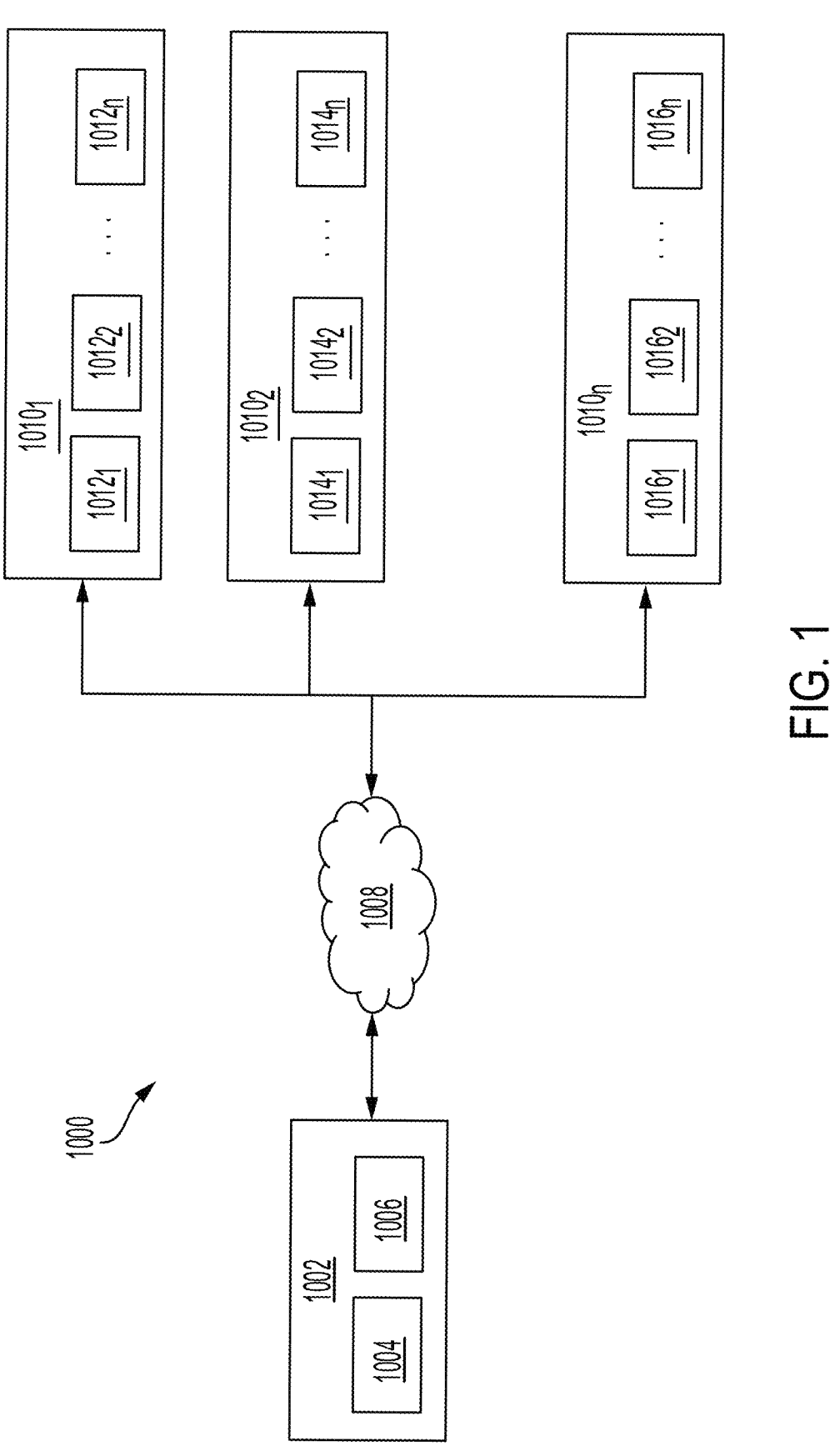
FIG. 1 illustrates a diagram of a system configured for identifying cyber security assets and generating cyber risk mitigation actions for a plurality of entities, in accordance with at least one non-limiting aspect of the present disclosure

Corresponding reference characters indicate corresponding items throughout the several views. The exemplifications set out herein illustrate various aspects of the present disclosure, in one form, and such exemplifications are not to be construed as limiting the scope of the present disclosure in any manner.

DETAILED DESCRIPTION

The Applicant of the present application owns the following U.S. Provisional Patent Applications, the disclosure of each of which is herein incorporated by reference in its entirety:

U.S. Provisional Patent Application No. 63/196,458 titled DEVICES, SYSTEMS, AND METHODS FOR ENHANCING SECURITY INFORMATION & EVENT MANAGEMENT UPDATES FOR MUL- TIPLE TENANTS BASED ON CORRELATED, AND SYNERGISTIC DEPLOYMENT NEEDS, filed on Jun. 3, 2021;

U.S. Provisional Patent Application No. 63/196,991, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 4, 2021;

U.S. Provisional Patent Application No. 63/294,570 titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 29, 2021;

U.S. Provisional Patent Application No. 63/295,150 titled DEVICES, SYSTEMS, AND METHODS FOR STREAMLINING AND STANDARDIZING THE INGEST OF SECURITY DATA ACROSS MULTIPLE TENANTS, filed on Dec. 30, 2021;

U.S. Provisional Patent Application No. 63/302,828 titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 25, 2022;

U.S. Provisional Patent Application No. 63/313,422 titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 24, 2022;

U.S. Provisional Patent Application No. 63/341,264 titled DEVICES, SYSTEMS, AND METHODS FOR SUMMARIZING ANALYTIC OBSERVATIONS, filed on May 12, 2022;

U.S. Provisional Patent Application No. 63/344,305 titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 20, 202;

U.S. Provisional Patent Application No. 63/345,679 titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 25, 2022

International Patent Application No. PCT/US22/72739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;

International Patent Application No. PCT/US22/72743, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 3, 2022;

U.S. Provisional Patent Application No. 63/365,819 titled DEVICES, METHODS, AND SYSTEMS FOR GENERATING A HIGHLY-SCALABLE, EFFICIENT COMPOSITE RECORD INDEX, filed on Jun. 3, 2022

U.S. Provisional Patent Application No. 63/353,992 titled DEVICES, SYSTEMS, AND METHODS FOR CATEGORIZING, PRIORITIZING, AND MITIGATING CYBER SECURITY RISKS, filed on Jun. 21, 2022;

U.S. Provisional Patent Application No. 63/366,903 titled DEVICES, SYSTEMS, AND METHOD FOR GENERATING AND USING A QUERYABLE INDEX IN A CYBER DATA MODEL TO ENHANCE NETWORK SECURITY, filed on Jun. 23, 2022;

U.S. Provisional Patent Application No. 63/368,567 titled DEVICES, SYSTEMS, AND METHODS FOR UTILIZING A NETWORKED, COMPUTER-ASSISTED, THREAT HUNTING PLATFORM TO ENHANCE NETWORK SECURITY, filed on Jul. 15, 2022;

U.S. Provisional Patent Application No. 63/369,582 titled AUTONOMOUS THREAT SCORING AND SECURITY ENHANCEMENT, filed on Jul. 27, 2022;

U.S. Provisional Patent Application No. 63/377,304, titled DEVICES, SYSTEMS, AND METHODS FOR CONTINUOUSLY ENHANCING THE IMPLEMENTATION OF CODE CHANGES VIA ENRICHED PIPELINES, filed on Sep. 27, 2022;

International Patent Application No. PCT/US22/82167 titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 21, 2022; and International Patent Application No. PCT/US22/82173 titled DEVICES, SYSTEMS, AND METHODS FOR STREAMLINING AND STANDARDIZING THE INGEST OF SECURITY DATA ACROSS MULTIPLE TENANTS, filed on Dec. 21, 2022.

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that is recited as performing a step or function, a different server, and/or processor, and/or a combination of servers, and/or processors.

As used herein, the term "entity" may refer to or include a company, a business-related organization, a non-profit organization, a governmental organization, a charitable organization, an educational institution, or any other type of organization or individual that may own or have an association with a collection of cyber assets. Reference to a "cyber asset," as used herein, may refer to a computing device, a network, hardware, software, data, information, or any other type information technology-related component, label, or identifier for switching, signaling, or routing such as, for example, a domain, an Internet Protocol (IP) address, or a shared and/or dynamic asset.

As used herein, the terms "domain" and "domain name" may refer to or include a string that identifies or is otherwise associated with a network, computing device, or other resource in communication with the Internet, such as, for example a server, personal computer, website, or other service communicated via the Internet. In some aspects, as used herein, "domain" and "domain name" may generally refer to domain names as they are described in *Domain Names—Implementation and Specification*, NETWORK WORKING GROUP (November 1987), https://datatracker.ietf.org/doc/html/rfc1035, the disclosure of which is incorporated by reference herein.

Entities generally have a basic need to understand and manage cyber security risks. More specifically, entities have a need to understand and manage cyber security risks related to their cyber assets. For example, an entity can have an Internet presence-a large collection of cyber assets that are used for Internet-related communications. One or more of these cyber assets may be configured such that the entity is potentially exposed to cyber threats. Cyber threats can include unwanted or malicious attempts to gain access to the entity's networks, data, and/or other information. Cyber threats may also include malicious denial of usage of cyber assets by their rightful owners, for example denial-of-service attacks, or ransomware. Thus, in order to identify potential exposure to cyber threats, and to take action against such threats, entities and/or their risk evaluators and auditors have a need to identify their cyber assets and how they are configured.

In order to further improve the management of cyber threats and other security risks, entities also have a need to identify and understand the cyber assets of other entities. This need may arise because the communication between entities could lead to threat exposure or perhaps because the cyber security risks of an entity could cause a catastrophic service failure outside the realm of the Internet with adverse implications for partner entities. For example, a first entity may use its cyber assets to communicate with the cyber assets of another entity. If the cyber assets of the other entity are susceptible to cyber threats, then communicating with these assets could put the first entity at risk. Therefore, entities have a need not only to identify and understand their own cyber assets, but also to identify and understand the risks posed by cyber assets of other entities.

However, the large-scale identification of entities and their cyber assets can be a complex, time-consuming, and resource-intensive process. To start, it can be difficult to simply distinguish entities from one another because they often share the same name. For example, an Internet search for the company "Island Realty" may identify companies with that name in Surf City NJ, Isle of Palms SC, Jamestown RI, Orange Park, FL, Grosse Ile MI, Grand Isle LA, and other locations across the globe. Moreover, entities often share similar names. For example, a company called "The Island Realty" located in Fisher's Island FI, could be mistaken for the various companies doing business under the name "Island Realty" listed above. Thus, in order to be able to classify a cyber asset (e.g., the domain name "islandrealty.com") as belonging to a particular entity, there is a need for methods, systems, and devices that reliably identify entities and distinguish them from each other.

Moreover, once a particular entity is identified, it can be complex and resource-intensive to identify some or all the cyber assets that are owned and/or controlled by that entity. For example, a type of cyber asset that can be important to identify when analyzing cyber risk are domains. Domains, along with IP addresses, are generally used as the primary identifiers of networks and other types of assets in IT systems. However, domains can be especially difficult to identify and classify as being owned or otherwise associated with an entity, in part, because of the overwhelming number of domains that are available for investigation. As of the second quarter of 2021, Verisign reported the Internet contained at least 367,000,000 registered domains See Verisign, 18 Domain Name Industry Brief 3, 2 (September 2021), https://www.verisign.com/assets/domain-name-report-Q22021.pdf, the disclosure of which is incorporated by reference herein. Each of these domains can potentially belong to a particular entity that is under evaluation.

Analyzing each of these domains to identify a potential association with the entity is a task of such scope, scale, and complexity that it cannot be practically performed by the human mind. Moreover, difficulty can arise when analyzing domains for a potential association with an entity because domain registration information can often be incomplete, incorrect, or purposely redacted. As an example, the registration information for a particular domain may only include a name and a phone number, but no other information that could be used to confirm an association with a particular entity. As another example, the name, phone number, or other information included in the registration information may contain spelling errors or typos (e.g. "Willims Computing" [sic] instead of "Williams Computing"; "123-465-7890" instead of "123-456-7890"). Thus, a security analyst tasked with identifying, analyzing, and/or managing the cyber assets of multiple entities is prone to misclassifying and/or never discovering relevant domain names. Moreover, contracting a security analyst to perform this task can be costly because of the effort and complexity involved.

Misclassifying and omitting domain names during the investigation of an entity can be detrimental to the cyber security risk analysis and mitigation process. As explained above, cyber assets may be configured such that they are potentially exposed to cyber threats. If a cyber asset (e.g., a domain) of a particular entity is exposed to a cyber threat but is also never identified as belonging to the entity, then the cyber security evaluation of that entity could be inaccurate and incomplete. Moreover, because the exposed cyber asset is never identified, it may be difficult or impossible for the evaluated entity, or other entities potentially communicating or otherwise doing business with the evaluated entity, to implement an action to mitigate the potential cyber threat. For example, it may be desirable to implement a configuration change in response to determining that a cyber asset is exposed to a cyber threat. However, if the cyber asset is never identified, the configuration change may not be implemented. Accordingly, there is a need for improved devices, systems, and methods for reliably identifying entities with an Internet presence, narrowing the hundreds of millions of existing domains to a manageable set of domains that can be analyzed for a potential association with the identified entities, and generating cyber risk mitigation actions based on the analyzed domains. Such enhancements could reduce the resources required to identify the cyber assets belonging to a particular entity while also improving accuracy. Additionally, such enhancements could allow for the automated implementation of cyber risk mitigation actions.

The present disclosure presents devices, systems, and methods for reliably identifying entities with an Internet presence, identifying cyber assets (e.g., domains) associated with particular entities, and/or implementing cyber risk mitigation actions based on the identified cyber assets. These devices, systems, and methods can provide many technological benefits, such as, for example: (1) more accurately identifying domains associated with an entity, in a non-routine way, by generating a list of candidate domains, fetching the candidate domains to determine routing information, and classifying the candidate domains as associated domains based on the routing information; (2) narrowing the hundreds of millions of existing registered domains to a manageable list of known redirecting domains (e.g., tens of millions of known redirecting domains) and classifying the redirecting domains as associated domains by fetching routing information of the redirecting domains—thereby identifying domains associated with an entity at a scale not practically performed by the human mind; and/or (3) integrating the generation of a database comprising the associated domains into a practical application by generating an automated cyber risk mitigation action based on the database.

Referring now to FIG. 1, a diagram of a system configured for identifying cyber security assets and generating cyber risk mitigation actions across multiple entities is illustrated, in accordance with at least one non-limiting aspect of the present disclosure. The system 1000 can include a cyber risk management provider server 1002 comprising a memory 1004 and a processor 1006. In various aspects, cyber risk management provider server 1002 can comprise the computer system 9000 and the various components thereof (e.g., processor 1006 can be similar to processor(s) 9004, memory 1004 can be similar to main memory 9006, etc.), as will be discussed in further reference to FIG. 6. The memory 1004 may be configured to store instructions that, when executed by processor 1006, carry out various aspects of the methods 100, 200, and/or 300 as described below with respect to FIGS. 2, 3, 4A, and 4B. The cyber risk management provider server 1002 can be communicably coupled, via network 1008, to a plurality of entities $1010_1$, $1010_2$ ... $1010_n$. Each entity $1010_1$, $1010_2$ ... $1010_n$ of the plurality can represent a tenant (e.g., a customer organization) contracting with the cyber risk management provider for cyber security services and/or an entity that may be evaluated by the cyber risk management provider for cyber threats. According to a non-limiting aspect of FIG. 1, the network 1008 can include any variety of wired, long-range wireless, and/or short-range wireless networks. For example, the network 1008 can include an internal network, a Local Area Network (LAN), WiFi®, cellular networks, near-field communication (hereinafter "NFC"), amongst others.

In further reference to FIG. 1, each entity $1010_1$, $1010_2$ ... $1010_n$ of the plurality can host and/or be associated with one or more instances of one or more cyber assets 1012, 1014, 1016 (sometimes referred to herein as clients 1012, 1014, 1016). For example, a first entity $1010_1$ can include one or more machines implementing or otherwise associated with one or more cyber assets $1012_1$, $1012_2$ ... $1012_n$, a second tenant $1010_2$ can include one or more machines implementing or otherwise associated with one or more cyber assets $1014_1$, $1014_2$ ... $1014_n$, and/or a third tenant $1010_n$ can include one or more machines implementing or otherwise associated with one or more cyber assets $1016_1$, $1016_2$ ... $1016_n$. Each entity $1010_1$, $1010_2$, ... $1010_n$ can include an intranet (i.e., network) by which each machine can communicate. As mentioned above, each entity $1010_1$, $1010_2$, ... $1010_n$ can represent a tenant (e.g., customer), such as an organization, contracting with the cyber risk management provider for security services. Accordingly, the cyber risk management provider server 1002 can be configured to have oversight over one or more of the entities $1010_1$, $1010_2$, and $1010_n$ of the plurality, and thus, can responsible for monitoring and/or managing an entity's cyber assets (e.g., 1012, 1014, 1016) in order to mitigate cyber security threats.

However, as previously discussed, identifying the cyber assets (e.g., 1012, 1014, 1016) of a plurality of entities (e.g. $1010_1$, $1010_2$, ... 1010) by a cyber risk management provider (e.g. using cyber risk management provider server 1002) can be a complex and resource-intensive process. Moreover, misclassifying and omitting cyber assets of a particular entity can be detrimental to the cyber security risk mitigation process. Thus, the disclosure now turns to various methods for identifying the cyber assets of a plurality of entities and generating cyber risk mitigation actions based on the identified assets.

Figure 2:
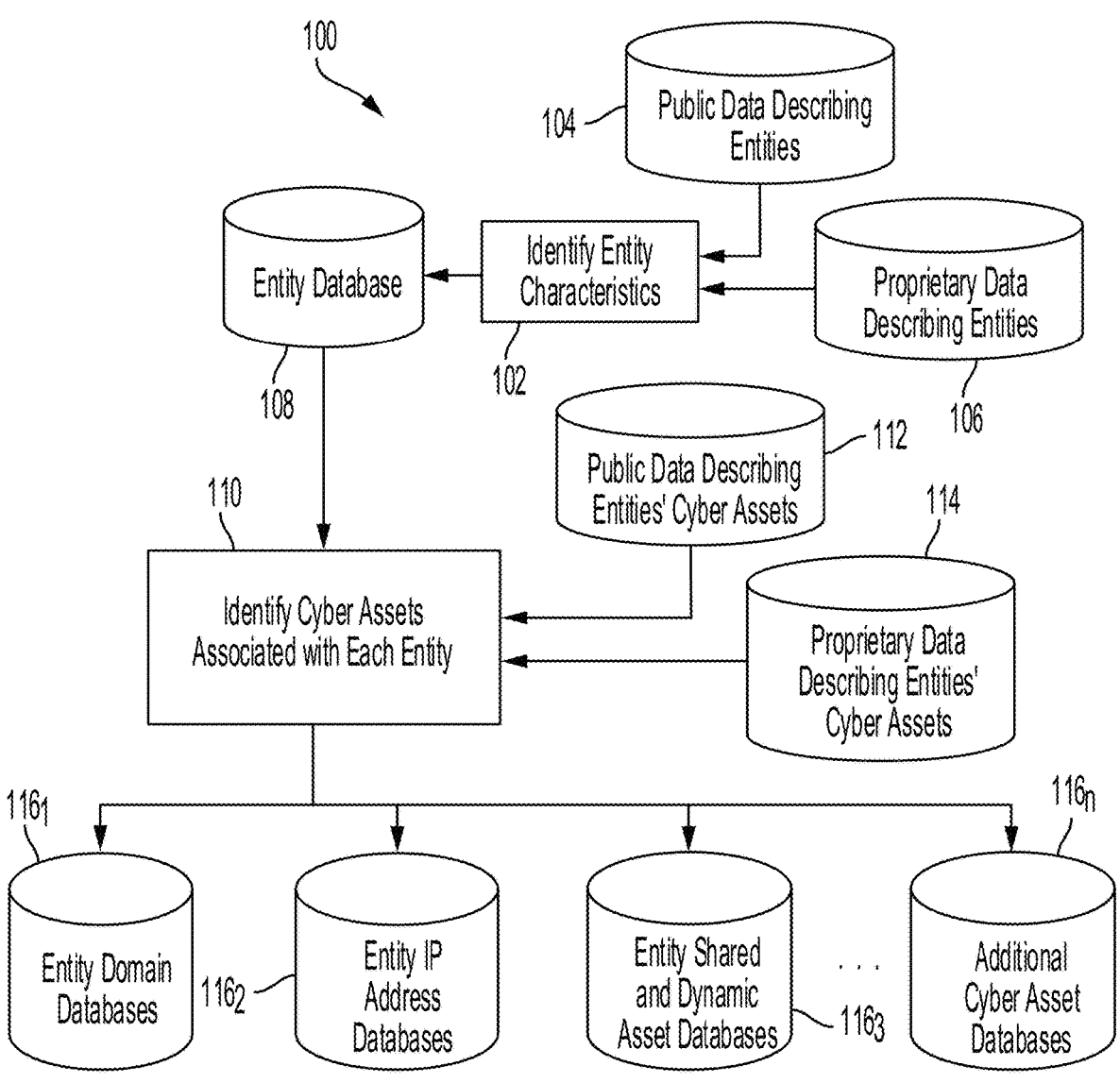
FIG. 2 illustrates a flow chart of a method for identifying cyber assets associated with a plurality of entities, in accordance with at least one non-limiting aspect of the present disclosure.

Referring now to FIG. 2, a flow chart of a method 100 for identifying cyber assets associated with a plurality of entities is illustrated, in accordance with at least one non-limiting aspect of the present disclosure. The method 100 of identifying cyber assets associated with a plurality of entities is sometimes referred to herein as "the footprinting process 100." In various aspects, the cyber risk management provider server 1002 of FIG. 1 can store instructions on memory 1004, executable by the processor 1006, to perform the footprinting process 100. Additionally, in various aspects, any of the steps of footprinting process 100 can be executed using an algorithm that employs machine learning, statistical techniques, and/or logical and expert systems-based techniques, as well as searching, sorting, collation and other data processing techniques and logic.

The footprinting process 100 can proceed by identifying 102 entity-specific characteristics to generate entity database 108. As explained above, it may be difficult to distinguish between entities because of ambiguities related to their identifying characteristics (e.g., entities may do business under the same or similar names). Thus, identifying 102 entity-specific characteristics can comprise executing an algorithm that causes the search and analysis of public data describing entities 104 and/or proprietary data describing entities 106 for identifiers that are specifically unique to a particular entity. Those unique identifiers can be correlated to specific entities to generate an entity database 108. For example, referring again to the "Island Realty" example mentioned above, searching public and/or proprietary data describing entities 104, 106 (e.g., domain registration data) may reveal that the domain "islandrealty.com" is registered to an organization doing business under the name "Island Realty" in South Carolina. Thus, because the domain "islandrealty.com" is unique and may not be shared by other entities, it can be used to reliably distinguish the cyber presence and assets of the "Island Realty" in South Carolina from other entities. This domain can be correlated with Island Realty in South Carolina and added to entity database 108.

The identifiers used to generate the entity database 108 can comprise identifiers such as, for example, Internet domains, street addresses, phone numbers, corporate registration numbers, and tax identifiers. The public data describing entities 104 can comprise databases with information such as, for example, Security and Exchange Commission (SEC) filings, Internal Revenue (IRS) disclosures, state-based corporate and/or charitable registrations with Secretaries of State, legal filings, government filings, Global Legal Entity Identifier Foundation identifiers, Public Key Certificates, information found on organizational websites, public internet registrations, patent filings, and trademark filings. The proprietary data describing entities 106 can comprise databases with information such as, for example, catalogues of firmographic information concerning entities purchased from Dun & Bradstreet, Moody's, Standard & Poor's, Zoominfo, Open Corporates, and mailing list and/or sales lead suppliers. The public data describing entities 104 and proprietary data describing entities 106 can often be incomplete and contain errors. Accordingly, in various aspects, identifying 102 entity-specific characteristics can comprise employing machine learning and/or statistical techniques, searching, sorting, collating, and logic-driven discrimination like expert systems evaluation to disambiguate entities.

The footprinting process 100 can continue by identifying 110 cyber assets associated with the entities in entity database 108. As explained above, a given entity can be associated with several different types of cyber assets, such as, for example, domains, IP addresses, and shared and dynamic assets. However, no prior source or method exists from which cyber assets of multiple entities can be easily identified and classified. Thus, to address this need, identifying 110 cyber assets associated with the entities in entity database 108 can comprise executing an algorithm or algorithms that cause the search and analysis of public data describing entities' cyber assets 112 and/or proprietary data describing entities' cyber assets 114. Based on this search and analysis, the specific types of cyber assets can be identified and correlated with the identifiers stored in entity database 108 to generate entity domain databases 116$_1$, entity IP address databases 116$_2$, entity shared and dynamic asset databases 116$_3$, and/or any number of other cyber asset databases 116$_n$ for storing data related to various types of cyber assets (collectively the "cyber asset databases 116"). The process of identifying 110 the cyber assets associated with each entity in the entity database 108 may comprise one or more of the steps of the method 300 for identifying entity domains to generate cyber risk mitigation actions discussed in detail below with respect to FIGS. 4A and 4B. In various aspects, the algorithm or algorithms used for identifying 110 cyber assets can employ searching, sorting, collating, and/or statistical techniques; logic-driven discrimination such as with an expert system evaluation; and/or machine learning.

In one aspect, the entity domain databases 116$_1$ can comprise a plurality of domain databases, wherein each domain database comprises domains that have been classified as being associated with a particular entity from the entity database 108. In another aspect, the entity IP address databases 116$_2$ can comprise a plurality of IP address databases, wherein each IP address database comprises IP addresses that have been classified as being associated with a particular entity from entity database 108. In another aspect, the entity shared and dynamic asset databases 116$_3$ can comprise a plurality of shared and dynamic asset databases, wherein each shared and dynamic asset database comprises shared and dynamic assets that have been classified as being associated with a particular entity from entity database 108. In yet another aspect, various other types of other cyber asset databases 116$_n$ can each comprise a plurality of type-specific cyber asset databases, wherein each type-specific cyber asset database comprises a specific type of cyber assets that have been classified as being associated with a particular entity from entity database 108. The cyber asset databases 116 can be used as the basis for generating cyber risk mitigation actions, as discussed below with respect to FIG. 3.

Figure 3:
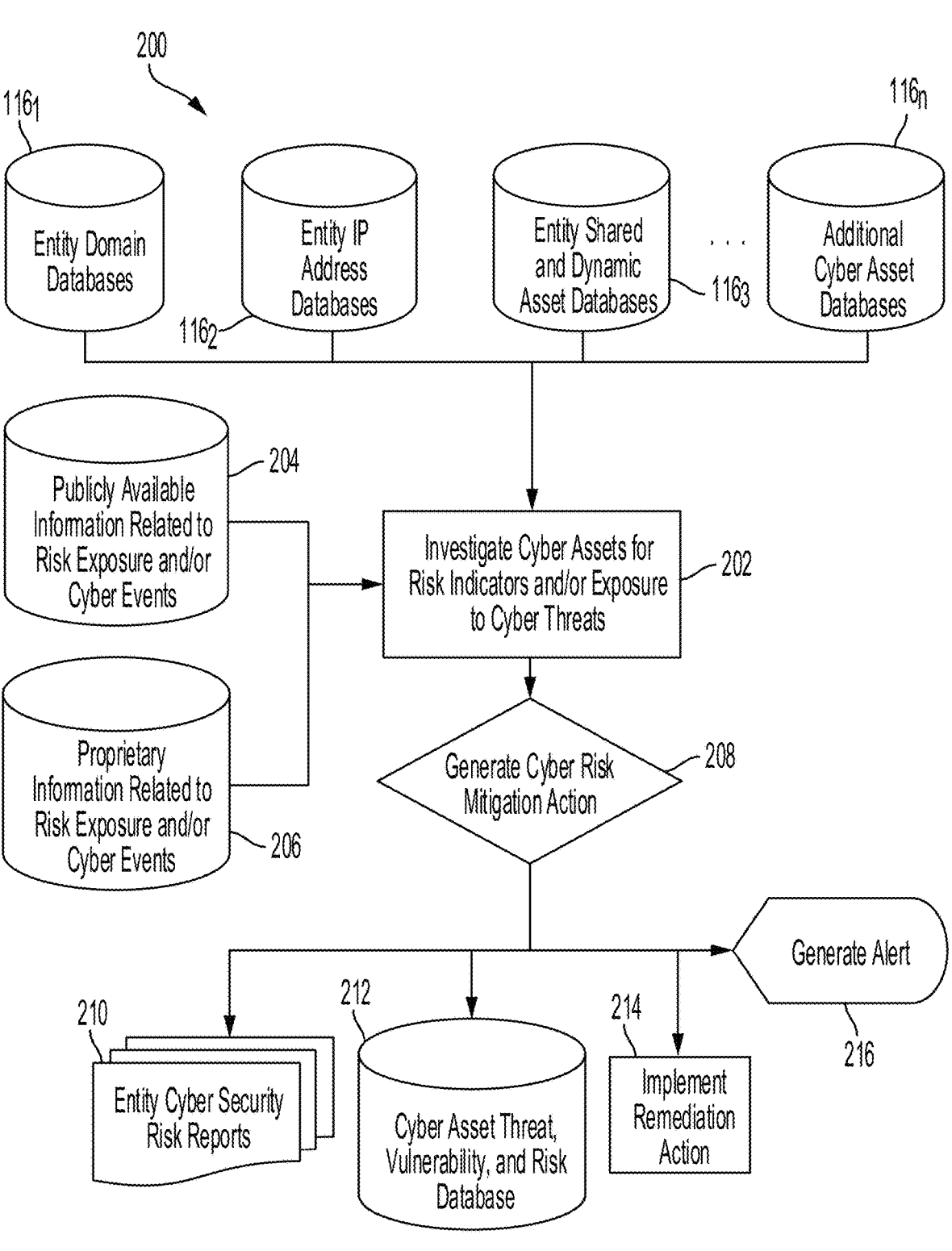
FIG. 3 illustrates a flow chart of a process for generating cyber risk mitigation actions across a plurality of entities based on the cyber assets identified in FIG. 1, in accordance with at least one non-limiting aspect of the present disclosure.

Referring now to FIG. 3, a flow chart of a method 200 for generating cyber risk mitigation actions across a plurality of entities, based on cyber asset databases 116 is illustrated, in accordance with at least one non-limiting aspect of the present disclosure. The method 200 of generating cyber risk mitigation actions across a plurality of entities is sometimes referred to herein as "the cyber risk mitigation process 200." In various aspects, the cyber risk management provider server 1002 of FIG. 1 can store instructions on memory 1004, executable by the processor 1006, to perform the cyber risk mitigation process 200. Additionally, in various aspects, any of the steps of the cyber risk mitigation process 200 can be executed using an algorithm that employs searching, sorting, collating, and/or statistical techniques; logic-driven discrimination such as with an expert system evaluation; and/or machine learning.

The cyber risk mitigation process 200 can begin by investigating 202 one or more of the cyber asset databases 116 for cyber assets that are exposed to cyber threats. As explained above, any of the cyber assets (e.g., domains, IP addresses, and shared and dynamic assets) of an entity may be configured such that the entity is exposed to cyber threats. Thus, investigating 202 the cyber asset databases 116 can comprise executing an algorithm or algorithms to determine which of the various cyber assets in cyber asset databases 116 may comprise a configuration that is vulnerable to or being exploited by a cyber threat. In various aspects, investigating 202 the cyber asset databases 116 for cyber threats may comprise one or more of the steps of the method 300 for identifying entity domains to generate cyber risk mitigation actions discussed in detail below with respect to FIGS. 4A and 4B.

Still referring to FIG. 3, in various aspects, the threat exposure of a given cyber asset configuration may be time-dependent and/or may vary depending on the occurrence of various cyber events. Thus, investigating 202 cyber asset databases 116 for cyber threats can also comprise searching and analyzing the Internet for publicly available information related to the presence of exploitation risk or the occurrence of cyber events 204 and/or searching and analyzing the Internet for proprietary information related to the presence of exploitation risk or the occurrence of cyber events 206 to identify cyber data and events that may indicate one or more of the cyber assets in cyber asset databases 116 is exposed to a cyber threat. In various aspects, the algorithm or algorithms for investigating 202 cyber asset databases 116 for cyber threats can employ various computer-implemented analysis techniques such as, for example, searching, sorting, collating, and/or statistical techniques; logic-driven discrimination such as with an expert system evaluation; and/or machine learning.

The cyber risk mitigation process 200 can continue by generating 208 one or more cyber risk mitigation actions based on the cyber threats and risk indicators identified at 202. Generating 208 a cyber risk mitigation action can comprise, for example, generating entity cyber security risk reports 210, generating a cyber asset threat, vulnerability, and risk database 212, implementing a remediation action 214, and generating an alert 216 (collectively "cyber risk mitigation actions 210, 212, 214, 216").

In various aspects, generating 208 a cyber risk mitigation action can comprise generating entity cyber security risk reports 210. The entity cyber security risk reports 210 can comprise one or more reports, each report comprising an evaluation of the cyber threat exposure of one or more entities in entity database 108 based on the investigation performed at 202. The risk reports 210 can comprise a risk level score that can be used by the cyber risk management provider to determine the relative risk level of a particular entity compared to other entities in entity database 108.

In various aspects, generating 208 a cyber risk mitigation action can comprise generating an entities' cyber asset threat, vulnerability, and risk database 212. The cyber asset threat, vulnerability, and risk database 212 can comprise a log of each of the assets from cyber asset databases 116 that has been identified as being exposed to a cyber threat, vulnerability, and/or risk at 202. The cyber asset threat, vulnerability, and risk database 212 or portions thereof may be referenced by the cyber risk management provider when making asset management decisions. For example, the cyber asset threat, vulnerability, and risk database 212 can be used to identify cyber assets that need configuration updates.

In various aspects, generating 208 a cyber risk mitigation action can comprise implementing 214 a remediation action. In some aspects, implementing 214 a remediation action can comprise executing an algorithm that causes an automated configuration update to one or more of the cyber assets identified as exposed to a cyber threat at 202. For example, implementing 214 a remediation action can comprise implementing 346 a remediated configuration based on an email-related cyber threat, implementing 362 a remediated configuration based on a host configuration-related cyber threat, and/or implementing 374 a remediated configuration based on a traffic-related cyber threat, as discussed below in reference to FIG. 3B.

In various aspects, generating 208 a cyber risk mitigation action can comprise generating 216 an alert in response to identifying one or more cyber assets as being exposed to a cyber threat at 202. For example, in one aspect, an alert may be sent to a security analyst of the cyber risk management provider and/or other parties charged with managing the cyber security of a particular entity. In other aspects, an alert may be sent to a cyber asset or the user of a cyber asset associated with an identified cyber threat. The generated 216 alert can comprise instructions for the security analyst, user, or other party to take a specific action in response to an identified cyber threat. In another aspect, the alert can also take the form of an automated control instruction to computer systems providing security services, for example a control message closing a port could be sent to an entity's firewall upon seeing evidence of malicious activity.

Having described a general implementation of devices, systems, and methods for the identification of entities with an Internet presence, the identification of cyber assets associated with the identified entities, and the generation of cyber risk mitigation actions based on the identified cyber assets, the disclosure now turns to the specific implementation of these devices, systems, and methods as they relate to the identification of domains associated with the entities and the generation of cyber risk mitigation actions based on the identified domains. Any of the aspects described below with respect to FIGS. 4A and 4B can be applied to the devices, systems, and methods described above with respect to the footprinting process 100 of FIG. 2 and the cyber risk mitigation process 200 of FIG. 3.

Figure 4A:
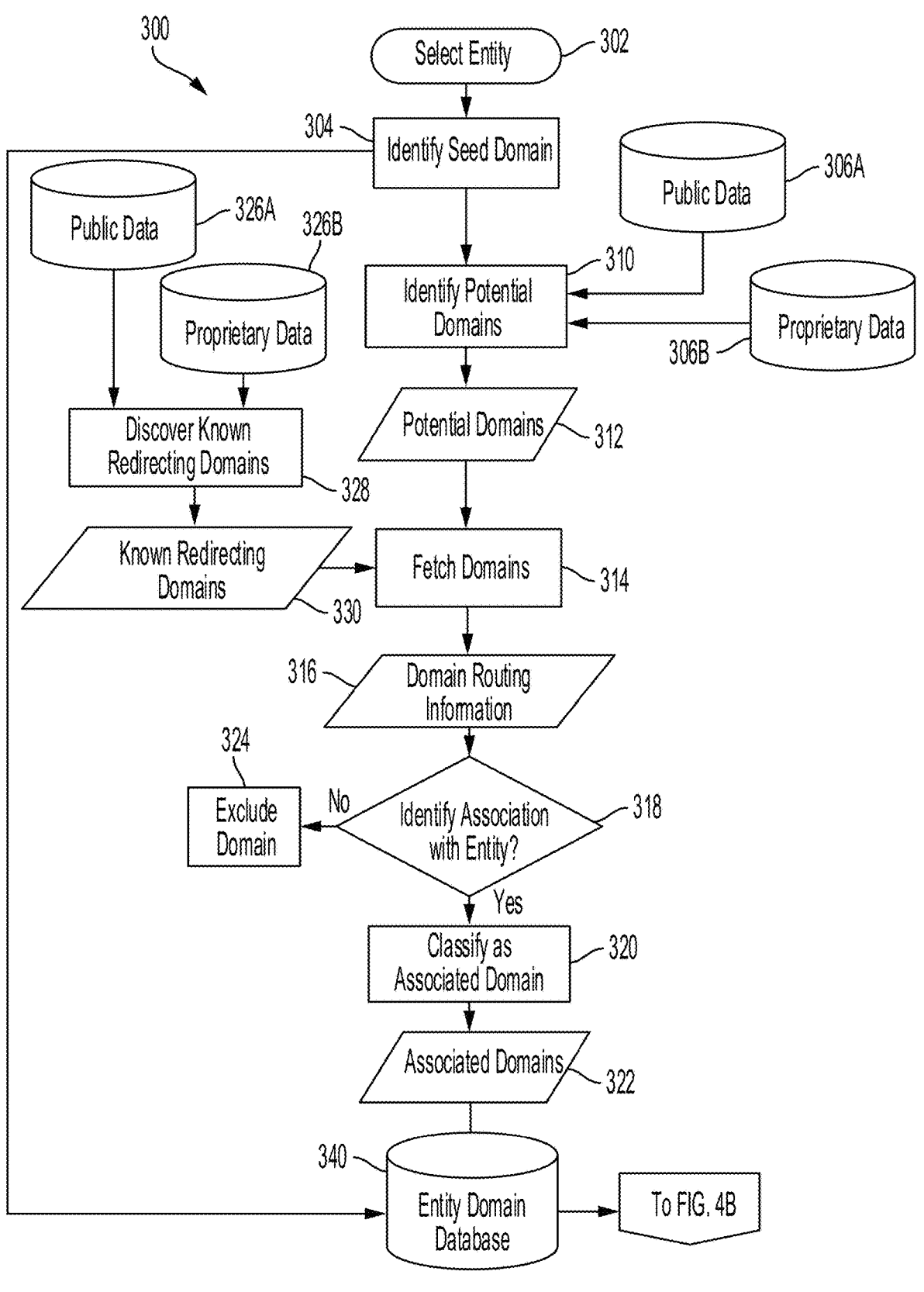
FIGS. 4A and 4B illustrate a flow chart of a process for generating cyber risk mitigation actions based on an entity domain database, in accordance with at least one non-limiting aspect of the present disclosure.
Figure 4B:
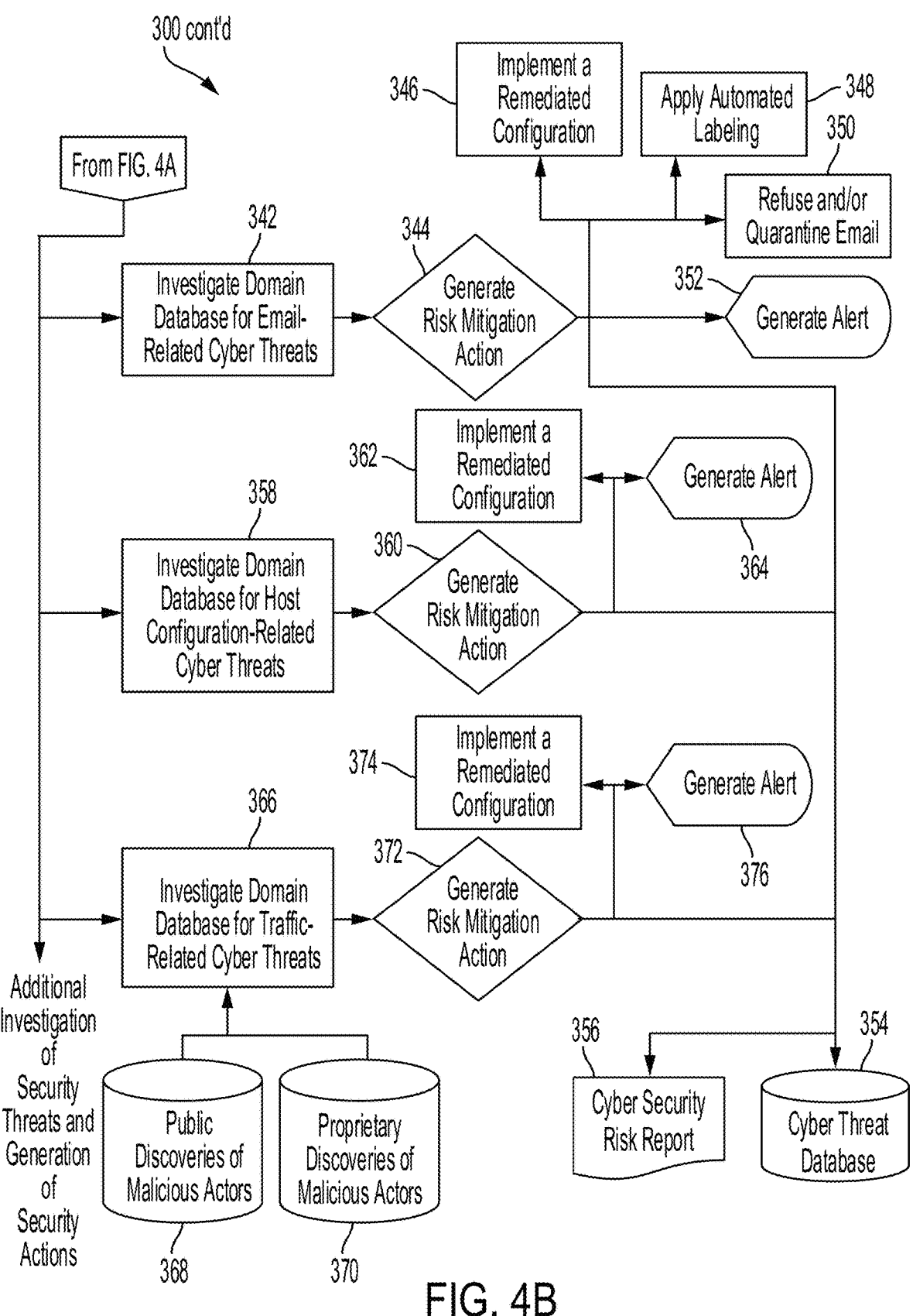

Referring now to FIGS. 4A and 4B, a flow chart of a method 300 for generating cyber risk mitigation actions based on an entity domain database 340 is illustrated, in accordance with at least one non-limiting aspect of the present disclosure. In various aspects, the cyber risk management provider server 1002 of FIG. 1 can store instructions on memory 1004, executable by the processor 1006, to perform the method 300. Additionally, in various aspects, any of the steps of the method 300 can be executed using an algorithm that employs various computer-implemented analysis techniques such as, for example, searching, sorting, collating, and/or statistical techniques; logic-driven discrimination approaches such as with an expert system evaluation; and/or machine learning.

Referring to FIG. 4A, the method 300 can begin by selecting 302 an entity (the "selected entity 302") for evaluation. The selected entity 302 can be, for example, an entity comprised in the entity database 108 of FIG. 1. The method 300 can continue by identifying 304 one or more seed domains of the selected entity 302. As used herein, a "seed domain" may generally refer to a domain associated with the selected entity 302. In some aspects, a seed domain can be a principal domain used by the selected entity 302. For example, a seed domain may be a domain where an entity's home page is served from (e.g., bluevoyant.com, amazon.com, uspto.gov, etc.). In some aspects, the one or more seed domains identified at 304 can be a domain that is identified as a unique identifier at 102 of FIG. 1 and stored in entity database 108.

Still referring to FIG. 4A, the method 300 can continue by identifying 310 potential domains 312 that are considered to be potential cyber assets of the selected entity 302. This list of potential domains 312 can be identified by searching and analyzing public data 306A, proprietary data 306B, or a combination thereof, for information suggesting that one or more of the more than 367,000,000 registered domains potentially belongs to or is otherwise controlled by the selected entity 302. In various aspects, the public data 306A can comprise databases such as, for example, Internet registration databases, the Internet Domain Name System (DNS), SEC filings, other regulatory filings, public key certificates, websites, the Federal Deposit Insurance Corporation, legal filings, governmental filings, and information found on company websites. The proprietary data 306B can comprise, for example, bulk DNS data that may be purchased and/or other domain-related information that may be purchased from companies such as, for example Domain Tools, Whois XML API, and IPinfo.

However, as explained above, the public data 306A and/or proprietary data 306B (e.g., registration information) available for a particular domain may be incomplete or incorrect (e.g., only include a name and/or phone number, include an incorrect name, include an incorrect phone number). Thus, because of the complexities and nuances related the public data 306A and/or proprietary data 306B, in some aspects, the search and analysis of the public data 306A and/or proprietary data 306B performed when identifying 310 potential domains 312 can be executed using statistical and/or machine learning techniques. For example, statistical and/or machine learning techniques may be employed to recognize a domain having the name "Willims Computing" (sic) listed in its registration information as potentially belonging to a selected entity 302 called "Williams Computing" and add this domain to the list of potential domains 312. Thus, identifying 310 potential domains 312 can effectively narrow the list of 367,000,000+ registered domains to a more manageable list of potential domains 312 by searching and analyzing public data 306A and/or proprietary data 306B—a process that is executed at a scope, scale, and complexity such that cannot be practically performed by the human mind. In some aspects, the process for identifying 310 potential domains can be executed using an algorithm that employs various computer-implemented analysis techniques such as, for example, searching, sorting, collating, and/or statistical techniques; logic-driven discrimination approaches such as with an expert system evaluation; and/or machine learning. As explained in more detail below, the potential domains 312 may be fetched 314 to retrieve domain routing information 316 that may be used to infer and/or confirm an association between a potential domain 312 and the selected entity 302.

Still referring to FIG. 4A, in some aspects, the method 300 may include discovering 328 domains that redirect 330 (sometimes referred to herein as "known redirecting domains 330") based on public data 326A and/or proprietary data 326B. Known redirecting domains 330 can comprise domains that are known to redirect, although the ultimate location of the redirection has not yet been determined. As explained in more detail below, the known redirecting domains 330 may be fetched 314 to retrieve domain routing information 316 that may be used to infer and/or confirm an association between a known redirecting domain 330 and the selected entity 302.

Discovering 328 known redirecting domains 330 and fetching 314 the known redirecting domains 330 to retrieve domain routing information 316 to identify 318 an association with a selected entity 302 can enable a more exhaustive, non-routine method for identifying and classifying domains as being associated with a particular entity compared to existing methods. For example, as mentioned above, domain registration information and other similar data sources traditionally used to identify an association between a domain and an entity may be incomplete and unreliable. Therefore, it may not be possible to confirm an association between a domain and an entity simply using registration information and other similar data sources. Thus, by relying only on domain registration information or other similar data sources, some domains may be unintentionally omitted from a cyber asset identification analysis altogether. As another example, it may be difficult to infer an association between a domain and an entity based on the domain's hosting information because several thousand or even millions of domains may be associated with a single IP address (e.g., GoDaddy servers may appear to serve tens of millions of domains). Thus, it may be impossible to make an informed conclusion about the association of a domain with a particular entity by analyzing only the DNS-provided hosting information of that domain. However, these domains (e.g., domains with incomplete registration information, domains sharing the same IP address with many other domains not associated with an entity of interest) may redirect to a known domain of an entity of interest. Therefore, where other search and analysis techniques may fail, a domain's routing information may be used to infer a relationship between a selected entity and the domain. Therefore, it can be beneficial to analyze the routing of information of domains that are known to redirect, even if the redirection location is unknown prior to the analysis.

Figure 5:
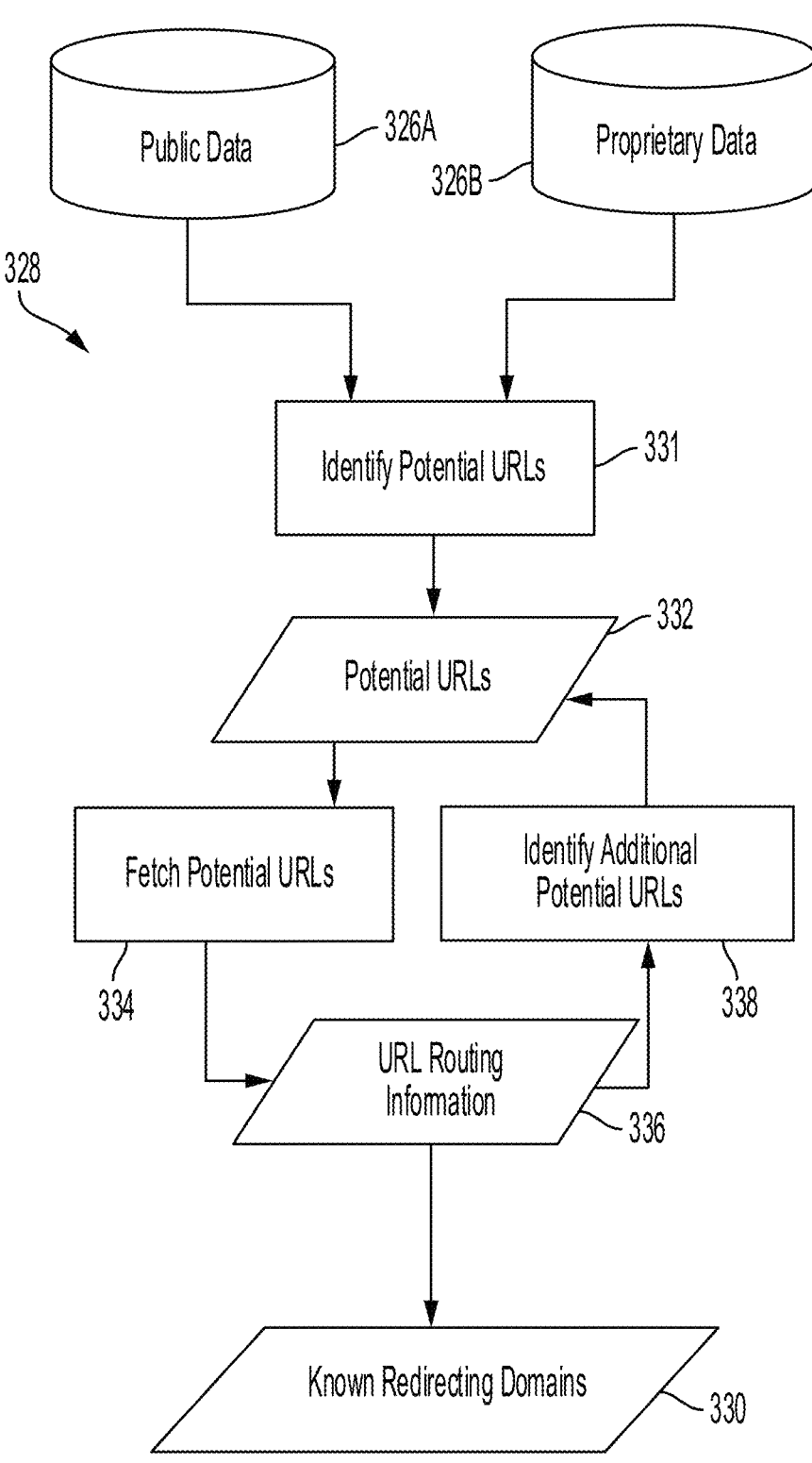
FIG. 5 illustrates a flow chart of an exemplary process for discovering known redirecting domains, in accordance with at least one non-limiting aspect of the present disclosure.

Various methods may be implemented to discover 328 known redirecting domains 330. In one aspect, referring now to FIG. 4A and FIG. 5, a method for discovering 328 known redirecting domains 330 may include identifying 331 potential uniform resource locators (URLs) 332 based on public data 326A and/or proprietary data 326B. In some aspects, public data 326A and proprietary data 326B may be similar to public data 306A and/or proprietary data 306B, respectively. Furthermore, in some aspects, potential URLs 332 may be identified based on a URL associated with a seed domain 304. For example, potential URLs 332 may be associated with a seed domain 304 by means other than redirection such as the keyword searching of one or more of registration data, public key certificates, DNS data, etc. In some aspects, computers on the Internet can be identified which serve mainly or exclusively to perform URL redirection. Domains which are redirected can be discovered by determining which of the universe of over 300 million domains appear, by virtue of the address reported by DNS to serve them, to be served on a computer identified as performing large amounts of URL redirection.

The identified 331 potential URLs 332 can be fetched 334 to retrieve URL routing information 336. If the URL routing information 336 indicates that one of the potential URLs 332 is associated with a domain that redirects to a different domain (a redirecting domain), then the redirecting domain may be discovered 328 as a known redirecting domain 330.

In various aspects, the URL routing information 336 may comprise information that can be used to identify 338 additional potential URLs. The additional potential URLs 332 may also be fetched 334. Fetching 334 the additional potential URLs 332 may reveal URL routing information 336 indicating that one of the additional potential URLs 332 is associated with a redirecting domain. Accordingly, the redirecting domain may be discovered 328 as a known redirecting domain 330.

In another aspect, the URL routing information 336 of the additional potential URLs 332 may be used to further identify 338 yet more additional potential URLs 332. This method for discovering 328 known redirecting domains 330 may continue in an iterative fashion, identifying 338 additional potential URLs 332 and fetching 334 additional potential URLs 332, until a computing threshold is satisfied or the iterative process concludes, having exhausted the search by looking at all URLs identifiable via recursive identification of URLs in data returned by servers and subsequent fetching. In some aspects, the computing threshold can be, for example, the identification of certain number of potential URLs 332, such as, for example, 100, 10,000, 100,000, 200,000, 300,000, 400,000, 500,000, 600,000, 700, 000, 800,000, 900,000, 1,000,000, 2,000,000, 3,000,000, 4,000,000, 5,000,000, 6,000,000, 7,000,000, 8,000,000, 9,000,000, 10,000,000, 100,000,000, or 1,000,000,000 potential URLs 332. In other aspects, the computing threshold can be, for example, based on reaching a computing time threshold, such as, for example, 10, 20, 30, 40, 50, 60, 70, 80, 100, 1,000, 10,000, or 100,000 seconds of computing time.

Referring again to FIG. 4A, in some aspects, public data 326A and/or proprietary data 326B can comprise a database of domains that have already been identified as domains that are known to redirect, although the ultimate redirection location may not be provided. For example, public data 326A may comprise data published by Commoncrawl (see e.g., "Server Responses with HTTP Status Code Other than 200 (404s, Redirects, etc.)," available at https://common-crawl.org/2016/09/robotstxt-and-404-redirect-data-sets/). Thus, discovering 328 known redirecting domains 330 may include identifying domains based on data sources such as Commoncrawl or other similar databases.

Still referring to FIG. 4A, the method 300 can continue by fetching 314 candidate domains 312, 330. As used herein, the term "candidate domains 312, 330" may be used to refer to only potential domains 312, may be used to refer to only known redirecting domains 330, or may be used to refer to both potential domains 312 and known redirecting domains 330. As used herein, the "fetching" may generally refer to the retrieval of data related to a particular cyber asset (e.g., retrieval of data related to a particular domain, or retrieval of data related to a URL). In various aspects, fetching 314 may be performed using software such as, for example, a common internet browser (e.g., Chrome, Firefox, Edge, etc.), or a command line interface tools (e.g., curl, wget, etc.), or custom developed software. The data retrieved by fetching 314 each of the candidate domains 312, 330 can comprise domain routing information 316. In some aspects, the domain routing information 316 can include signaling and routing information.

The domain routing information 316 can comprise many different types of information that may be used to infer an association between a candidate domain 312, 330 and the selected entity 302. In one aspect, the domain routing information 316 can comprise information (e.g., signaling and routing information) indicating that one of the candidate domains 312, 330, when fetched, redirects to one or more of the seed domains identified at 304. Redirection to a seed domain may occur, for example, after first redirection from a candidate domain 312, 330. Redirection to the seed may also occur, for example, after a chain of two or more redirections that are initiated by fetching 314 a candidate domain 312, 330. For example, a candidate domain 312, 330 may be "b.com." When fetching 314 the domain "b.com", the domain routing information 316 may indicate that candidate domain 312, 330 "b.com" ultimately redirects to a seed domain "a.com" after a chain of one or more redirects.

Figure 4C:
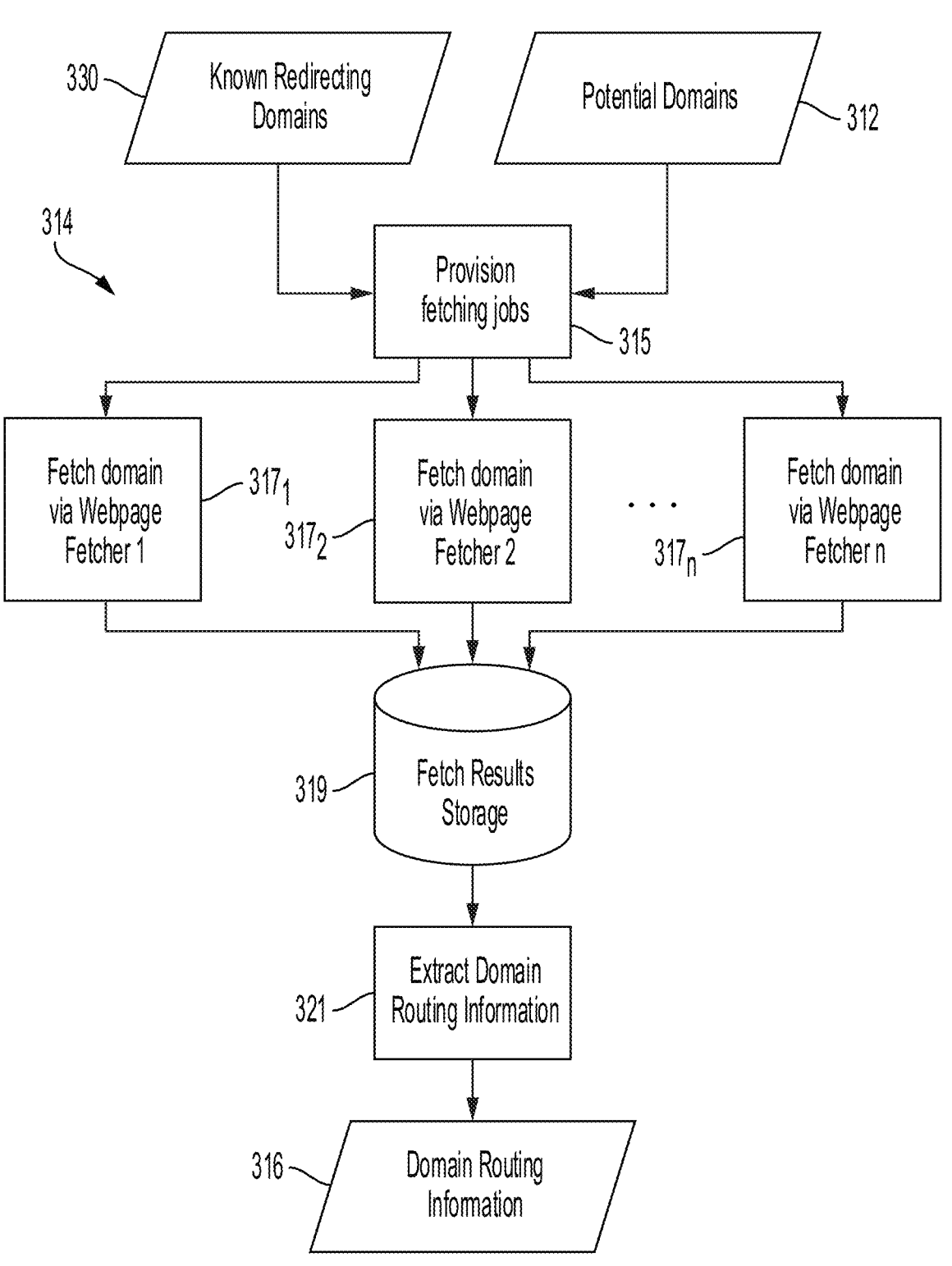
FIG. 4C illustrates a flow chart of an example of process for fetching domains, which can be implemented according to the process for generating cyber risk mitigation actions based on an entity domain database of FIGS. 4A and 4B, in accordance with at least one non-limiting aspect of the present disclosure.

The process of fetching 314 candidate domains 312, 330 can include a plurality (e.g., 100) of separately provisioned and highly parallelized processes that occur at a scope and scale not capable of being performed by the human mind. For example, FIG. 4C illustrates a flow chart of an example of process for fetching 314 candidate domains 312, 330, which can be implemented according to the method 300. According to the one non-limiting aspect FIG. 4C, each of the candidate domains 312, 330 (e.g., known redirecting domains 330 and/or the potential domains 312) may be fed into a job distributor module. The job distributor module can provision 315 the candidate domains 312, 330 to one of a plurality of webpage fetchers (e.g., webpage fetcher 1, webpage fetcher 2, . . . webpage fetcher n). Each of the plurality of webpage fetchers can fetch $317_1$, $317_2$, . . . $317_n$ the corresponding one of the candidate domains 312, 330 provisioned 315 thereto. The job distributor module and/or each of the plurality of webpage fetchers can be a separately provisioned resource. For example, each webpage fetcher may be executed by a separate processor or group of processors. As another example, each webpage fetcher can correspond to a segmented resource provisioned by a distributed network (e.g., a pool of processors). Each of the plurality of webpage fetchers can access the Internet through an independent access channel in order to fetch $317_1$, $317_2$, . . . $317_n$ the candidate domains 312, 330. Thus, each of the webpage fetchers can fetch $317_1$, $317_2$, . . . $317_n$ the corresponding one of the candidate domains 312, 330 provisioned 315 thereto in parallel. Accordingly, the process of fetching 314 candidate domains 312, 330 can be carried out at a scope and scale that the human mind is not capable of performing.

Still referring to FIG. 4C, the fetch results generated by fetching $317_1$, $317_2$, . . . $317n$ the candidate domains 312, 330 can be stored in a fetch results storage 319. Domain routing information 316 corresponding to each of the fetched $317_1$, $317_2$, . . . $317_n$ candidate domains 312, 330 can be extracted 321 from the fetch storage 319.

Referring again to FIG. 4A, The method 300 can continue by identifying 318 whether the domain routing information 316 indicates that one of the candidate domains 312, 330 is associated with (e.g., owned or otherwise controlled by) the selected entity 302. If the domain routing information 316 comprises information indicating that a candidate domain 312, 330 redirects to an identified seed domain 304, then an association between the candidate domain 312, 330 the selected entity 302 may be identified. Based on this identified association, the candidate domain 312, 330 can be classified 320 as an associated domain and added to a list of associated domains 322. For example, if routing information 316 comprises information indicating that "b.com," a candidate domain 312, 330, redirects to a seed domain "a.com" of the selected entity 302, then it may be inferred that "b.com" is owned or otherwise controlled by the selected entity 302. Thus, "b.com" can be classified 320 as an associated domain and added to the list of associated domains 322.

In various aspects, the domain routing information 316 can comprise information indicating that one of the candidate domains 312, 330, when fetched, redirects to one of the previously classified associated domains 322. It may be inferred that a candidate domain 312, 330 redirecting to an associated domain 322 is owned or otherwise controlled by selected entity 302. Accordingly, identifying 318 an association with the selected entity 302 can comprise identifying that a candidate domain 312, 330 redirects to an associated domain 322. Further, the candidate domain 312, 330 can be classified 320 as an associated domain and added to a list of associated domains 322. For example, a candidate domain 312, 330 may be "c.com." When fetching 314 the domain "c.com," the domain routing information 316 may indicate that "c.com" redirects to "b.com," a domain previously classified as an associated domain 322. Thus, based on the routing information 316, it may be inferred that "c.com" is owned or otherwise associated with the selected entity 302.

In various aspects, the domain routing information 316 can comprise information indicating that one of the candidate domains 312, 330, when fetched, redirects to a subdomain of a seed domain identified at 304. It can be inferred that a candidate domain 312, 330 redirecting to a subdomain of a seed domain is owned or otherwise controlled by selected entity 302. Accordingly, identifying 318 an association with the selected entity 302 can comprise identifying that a candidate domain 312, 330 redirects to a subdomain of a seed domain. Further, the candidate domain 312, 330 can be classified 320 as an associated domain and added to the list of associated domains 322. For example, a candidate domain 312, 330 may be "b.com." When fetching 314 the domain "b.com," the domain routing information 316 may indicate that "b.com" redirects to "shop.a.com," wherein "shop.a.com" is a subdomain of a seed domain "a.com" identified at 304. Thus, based on the routing information 316, it may be inferred that "b.com" is owned or otherwise associated with the selected entity 302.

In various aspects, the domain routing information 316 can comprise information indicating that one of the candidate domains 312, 330, when fetched, redirects to a subdomain of a previously classified associated domain 322. It can be inferred that a candidate domain 312, 330 redirecting to a subdomain of an associated domain 322 is owned or otherwise controlled by selected entity 302. Accordingly, identifying 318 an association with the selected entity 302 can comprise identifying that a candidate domain 312, 330 redirects to a subdomain of an associated domain 322. Further, the candidate domain 312, 330 can be classified 320 as an associated domain and added to the list of associated domains 322. For example, a candidate domain 312, 330 may be "c.com." When fetching 314 the domain "c.com," the domain routing information 316 may indicate that "c.com" redirects to "shop.b.com," wherein "shop.b.com" is a subdomain of an associated domain "b.com" classified at 320. Thus, based on the routing information 316, it may be inferred that "c.com" is owned or otherwise associated with the selected entity 302.

In various aspects, the domain routing information 316 can comprise intermediate and/or final hosting information. The intermediate and/or final hosting information may comprise, for example, an IP address. In some aspects, the IP address may be the hosting address of a candidate domain 312, 330. In some aspects, the IP address may be the hosting address of a domain that candidate domain 312, 330 redirects to. If the intermediate and/or final hosting information of a candidate domain 312, 330 is the same as the hosting information of a seed domain identified at 304 and/or the same as the hosting information of an associated domain 322 classified at 320, then it may be inferred that candidate domain 312, 330 is owned or otherwise controlled by selected entity 302. Accordingly, identifying 318 an association with the selected entity 302 can comprise identifying that the intermediate and/or final hosting information of a candidate domain 312, 330 is the same as the hosting information for a seed domain. Further, the candidate domain 312, 330 can be classified 320 as an associated domain and added to a list of associated domains 322. For example, a candidate domain 312, 330 may be "b.com." When fetching 314 the domain "b.com," the domain routing information 316 may indicate that "b.com" has hosting information comprising an IP address "123.456.789.100." A seed domain "a.com" identified at 304 may also have hosting information comprising an IP address "123.456.789.100" which is known to be solely used by the owner of a.com. Thus, based on hosting information comprised in routing information 316, it may be inferred that "b.com" is owned or otherwise associated with the selected entity 302.

In various aspects, it may be identified 318 that the domain routing information 316 comprises information (and/or a lack of information) indicating there is no association between the candidate domain 312, 330 and the selected entity 302. If it is identified 318 that a candidate domain 312, 330 is not associated with the selected entity 302, then the potential domain may be excluded 324 from further consideration as a redirection-equivalent domain belonging to the entity.

Various parameters can be used to identify 318 that a candidate domain 312, 330 is not associated with the selected entity 302. In some aspects, it may be identified 318 that there is no discernable association between a candidate domain 312, 330 and the selected entity 302 based on the redirection information comprised in the domain routing information 316. For example, a candidate domain 312, 330 may be excluded 324 from further analysis as a redirect if the candidate domain 312, 330 does not redirect to a seed domain identified at 304. As another example, a candidate domain 312, 330 may be excluded 324 from further analysis as a redirect if the candidate domain 312, 330 does not redirect to a subdomain of the seed domain 304. As yet another example, a candidate domain 312, 330 may be excluded 324 from further analysis as a redirect if the candidate domain 312, 330 does not redirect to an associated domain 322 and/or a subdomain of an associated domain 322.

In some aspects, it may be identified 318 that there is no association between a candidate domain 312, 330 and the selected entity 302 if the routing information 316 indicates that the candidate domain 312, 330 is not being actively used by the selected entity 302. For example, a candidate domain 312, 330 may be excluded 324 from further analysis as a redirect-equivalent domain if the routing information 316 indicates that the candidate domain 312, 330 and/or a domain that the candidate domain 312, 330 redirects to is inactive (e.g., parked, under construction, available for resale).

In some aspects, it may be identified 318 that there is no association between a candidate domain 312, 330 and the selected entity 302 based on a URL path of the candidate domain 312, 330 and/or a domain that the candidate domain 312, 330 routes to. In one aspect, a candidate domain 312, 330 may be excluded 324 from further analysis if the candidate domain 312, 330 routes to a domain with a URL that exceeds a path segment threshold, such as, for example, a path segment threshold of 2, 3, 4, 5, 6, 7, 8, 9, or 10 path segments, or greater than 10 path segments. The use of a path segment threshold to exclude potential domains may reduce the risk of misidentifying candidate domains 312, 330 as associated domains 322. For example, a candidate domain 312, 330 may be "b.com." The routing information 316 may indicate that "b.com" redirects to a domain having URL with greater than 3 path segments: "d.com/en/shopping/men/shirts/cotton/long_sleves/dress_shirts.html". Based on this routing information, "b.com" may be excluded 324 from further analysis. In one aspect, a candidate domain 312, 330 may be excluded 324 from further analysis based on a statistical discrimination algorithm, generated using machine learning, that analyzes a URL path segment of the candidate domain 312, 330 and/or a domain that the candidate domain 312, 330 routes to. In various aspects, the statistical discrimination algorithm may be implemented to identify candidate domains 312, 330 that have been erroneously classified as associated domains 322. In various aspects, the statistical discrimination algorithm may be implemented to confirm that candidate domains 312, 330 have been correctly classified as associated domains 322.

Still referring to the method 300 of FIG. 4A, the associated domains 322 and the one or more seed domains identified at 304 may be used to generate an entity domain database 340. The entity domain database 340 can comprise each of the domains identified in method 300 that are considered to be owned or otherwise controlled by the selected entity 302. The method 300 may continue at FIG. 4B.

Referring to FIG. 4B, the method 300 can continue by investigating the domains comprised in domain database 340 for cyber security threats, such as, for example, investigating 342 for email-related cyber threats, investigating 358 for host configuration-related cyber threats, investigating 366 for traffic-related cyber threats, or investigating for additional types of cyber threats.

In some aspects, the domain database 340 can comprise domains that are associated with email configurations of the selected entity 302. For example, entities often associate email addresses with a well-known domain (e.g., the email address "billg@microsoft.com" and the domain "microsoft.

com"). Thus, the domain database 340 can be investigated 342 for email-related security threats. An email-security related threat can comprise, for example, the use of an email configuration lacking an email authentication method or an email configuration with a misconfigured authentication method. Various methods of domain-based email authentication exist, such as, Sender Policy Framework (SPF), DomainKeys Identified Mail (DKIM), and other similar sender domain-based methods of allowing email recipients to validate email (e.g. DMARC, BIMI, etc.). See Kitterman, S., *Sender Policy Framework (SPF) for Authorizing Use of Domains in Email, Version* 1, RFC 7208, DOI 10.17487/ RFC7208 (April 2014) https://www.rfc-editor.org/info/ rfc7208; Crocker, D., Ed., Hansen, T., Ed., and M. Kucherawy, Ed., *DomainKeys Identified Mail (DKIM) Signatures*, STD 76, RFC 6376, DOI 10.17487/RFC6376, (September 2011) https://www.rfc-editor.org/info/rfc6376; and Rose et al., *Trustworthy Email*, NIST Special Publication 800-177 Rev. 1, (February 2019), https://nvlpubs.nist.gov/nistpubs/ SpecialPublications/NIST.SP.800-177r1.pdf, each of which are incorporated by reference herein in their entirety. Thus, in some aspects, investigating 342 for email-related cyber risks may comprise analyzing the domains in domain database 340 for the use of an email authentication method. However, email authentication can be misconfigured such that the authentication method is insecure. Therefore, in other aspects, investigating 342 for email-related cyber threats can comprise analyzing the domains in domain database 340 for the use of a misconfigured email authentication method. In other aspects, various other email security controls may be investigated 342. For example, investigating 342 for email-related cyber threats may include assessing an entity's usage of SPAM filters, malware detection, phishing protections, etc.

Still referring to FIG. 4B, the method 300 can continue by generating 344 one or more cyber risk mitigation actions based on the identified email-related cyber threats. Generating 344 one or more cyber risk mitigation actions can comprise, for example, automatically implementing 346 a remediated email authentication configuration, applying 348 automated labeling indicating that an email may not be authentic, automatically refusing 350 and/or quarantining 350 an email that may be exposed to a cyber threat, generating 352 an alert, generating a cyber threat database 354, and/or generating a cyber security risk report 356.

In various aspects, generating 344 one or more cyber risk mitigation actions can comprise automatically implementing 346 a remediated email authentication configuration based on the investigation 342 of email-related cyber threats. For example, referring now to FIGS. 1, 4A and 4B, the selected entity 302 may be an entity 1010₁ contracting with a cyber risk management provider (i.e., a tenant entity 1010₁). The cyber risk management provider server 1002 may have write access to at least some of the tenant entity's 1010₁ cyber assets 1012₁, 1012₂, . . . 1012ₙ, thereby enabling the cyber risk management provider to cause an update to an email configuration associated with a domain of the tenant entity 1010₁. In response to identifying a domain comprising an email configuration that lacks an authentication method or an email configuration that has a misconfigured authentication method, the cyber risk management provider server 1002 can automatically generate instructions that are sent (e.g. via a network 1008) to a cyber asset 1012 of the tenant entity 1010₁. The instructions can cause an automated update to the email configuration associated with the identified domain. The remediated email authentication configuration can comprise a new email authentication configuration and/or a corrected email authentication configuration.

Still referring to FIGS. 1, 4A and 4B, in various aspects, generating 344 one or more cyber risk mitigation actions can comprise applying 348 automated labeling based on the investigation 342 for email-related cyber threats. For example, a tenant entity 1010₁ may be contracting with a cyber risk management provider to conduct a cyber security risk analysis of other entities 1010₂ . . . 1010ₙ. The selected entity 302 may be one of the other entities 1010₂ . . . 1010ₙ that is being analyzed by the cyber risk management provider. The cyber risk management provider server 1002 may have write access to at least some of tenant entity's 1010₁ cyber assets 1012₁, 1012₂, . . . 1012ₙ, thereby enabling the cyber risk management provider to cause an update to an email configuration associated with a domain of the tenant entity 1010₁. In response to identifying a domain (e.g., a cyber asset 1014 of one of the other entities 1010₂) comprising an email configuration that lacks an authentication method or an email configuration that has a misconfigured authentication, the cyber risk management provider server 1002 can automatically generate instructions that are sent (e.g. via a network 1008) to a cyber asset 1012 of the tenant entity 1010₁. The instructions can cause the cyber asset 1012 of the tenant entity 1010₁ to apply automated labeling to emails received by the tenant entity 1010₁ from the exposed domain (e.g. cyber asset 1014) of the other entity 1010₂. In some aspects, automated labeling may be applied to emails received from all domains (all cyber assets 1014₁, 1014₂, . . . 1014ₙ) in the domain database 340 of the other entity 1010₂. The automated labeling may be text added to the received email indicating that the mail may not be authentic.

Still referring to FIGS. 1, 4A and 4B, in various aspects, generating 344 one or more cyber risk mitigation actions can comprise refusing 350 to receive emails and/or quarantining 350 received emails based on the investigation 342 for email-related cyber threats. For example, cyber risk management provider server 1002 may automatically generate instructions that are sent (e.g. via a network 1008) to a cyber asset 1012 (e.g. an email server) of the tenant entity 1010₁ causing the cyber asset 1012 refuse receipt of emails sent from the exposed domain (e.g. cyber asset 1014) of another entity 1010₂. In some aspects, the instructions can cause a cyber asset 1012 of the tenant entity 1010₁ to quarantine emails received from the exposed domain (e.g. cyber asset 1014) of the entity 1010₂. This may enable the quarantine emails to be investigated for authenticity.

Still referring to FIGS. 1, 4A and 4B, in various aspects, generating 344 one or more cyber risk mitigation actions can comprise generating 352 an alert based on the investigation 342 for email-related cyber threats. The alert can be sent to the cyber risk management provider or another party charged with managing the cyber assets of a particular tenant entity 1010₁. In some aspects, the alert can comprise a message indicating, for example, a compromised email configuration has been detected, a potentially inauthentic email has been sent, and/or a potentially inauthentic mail has been received. In some aspects, the alert can comprise instructions to take a specific action in response to the identified email-related cyber threat.

Still referring to FIGS. 1, 4A and 4B, in various aspects, generating 344 one or more cyber risk mitigation actions can comprise generating a cyber threat database 354 based on the investigation 342 for email-related cyber threats. The cyber threat database 354 can comprise a log of each of the domains from domain database 340 that has been identified as being exposed to an email-related cyber threat. The cyber threat database 354 or portions thereof may be referenced by a security analyst of the cyber risk management provider or another party charged with managing the cyber assets of a particular tenant entity $1010_1$. For example, the cyber threat database can be used to identify domains that need email configuration updates.

Still referring to FIGS. 1, 4A and 4B, in various aspects, generating 344 one or more cyber risk mitigation actions can comprise generating a cyber security risk report 356 based on the investigation 342 for email-related cyber threats. The cyber security risk report 356 can comprise an evaluation of the cyber threat exposure of the selected entity 302 (e.g., a tenant entity $1010_1$ or another entity $1010_2, \ldots 1010_n$) based on the identified email-related cyber threats. For example, an entity's use of email authentication can be an important factor in evaluating how well the entity's cyber assets are protected against cyber threats such as malicious email forgeries.

Referring again primarily to FIGS. 4A and 4B, in various aspects, the domain database 340 can comprise domains that are associated with (e.g., that address or otherwise identify) computers that are owned, controlled, or used by the selected entity 302. Thus, referring to FIG. 4B, the domain database 340 can be investigated 358 for host configuration-related security threats. A host configuration-related threat can comprise an insecure configuration and/or operation of a computer associated with a domain in the domain database 340. There are numerous types of computing services and implementations of computing services that may cause an insecure configuration or operation of a computer, and the list is ever expanding. Additionally, there are numerous Internet ports and related services that can be scanned for host-related security threats.

As just one example, investigating 358 for host configuration-related security threats can comprise visiting the one or more server(s) associated with a selected entity 302 (e.g. "www.example.com") and searching for information such as the server type, software release version, available encryption parameters, or other security-relevant information presented by the server. This information can be analyzed to identify security threats such as, for example, running a server with a known security vulnerability, using deprecated cryptographic services, or failing to control access to sensitive information.

As another example, investigating 358 for host configuration-related security threats can comprise identifying inherently insecure non-web server services employed on host computers associated with domains in domain database 340. These threats may be identified by searching for the service, software release version, available encryption parameters, or other security-relevant information. Insecure services can comprise, for example, older versions of telnet (e.g., a computer addressable as "telnet.example.com") which transmit usernames and passwords without encryption or open databases of sensitive information. See *Unprotected Elasticsearch Server Leaks 5 Billion Records*, CISO-MAG (Mar. 20, 2020) https://cisomag.eccouncil.org/unprotected-elasticsearch-server-leaks-5-billion-records/, incorporated by reference herein in its entirety. Additionally, insecure services can comprise, for example, a file transfer protocol (FTP) server found at "ftp.example.com". FTP is known to suffer numerous security vulnerabilities. See Nate Lord, *What is FTP Security? Securing FTP Usage*, Digital Guardian (Sep. 7, 2018), https://digitalguardian.com/blog/what-ftp-security-securing-ftp-usage, incorporated by reference herein in its entirety. Thus, investigating 358 for host configuration-related security threats may comprise analyzing the host computers associated with domains in domain database 340 for the use of insecure configurations or operations.

Still referring to FIG. 4B, the method 300 can continue by generating 360 one or more cyber risk mitigation actions based on the host configuration-related cyber threats identified at 358. The various actions that can be generated 360 comprise, for example, automatically implementing 362 a remediated host configuration, generating 364 an alert, generating a cyber threat database 354, and/or generating a cyber security risk report 356.

Referring again to FIGS. 1, 4A and 4B, in various aspects, generating 360 one or more cyber risk mitigation actions can comprise automatically implementing 362 a remediated host configuration based on the investigation 358 for host configuration-related cyber threats. For example, as explained above, the selected entity 302 may be an entity $1010_1$ contracting with a cyber risk management provider (i.e., a tenant entity $1010_1$). The cyber risk management provider server 1002 may have write access to at least some of the tenant entity's $1010_1$ cyber assets $1012_1, 1012_2, \ldots 1012_n$, thereby enabling the cyber risk management provider to cause an update to a configuration of a host computer associated with a domain of the tenant entity $1010_1$. In response to identifying a domain associated with a host computer employing an insecure configuration, the cyber risk management provider server 1002 may automatically generate instructions that are sent (e.g. via a network 1008) to a cyber asset 1012 of the tenant entity $1010_1$. The instructions can cause an automated update to the configuration of the host computer associated with the identified domain. The remediated host configuration can comprise, for example, a new version of the insecure host configuration or a replacement service for the insecure host configuration.

Still referring to FIGS. 1, 4A and 4B, in various aspects, generating 360 one or more cyber risk mitigation actions can comprise generating 364 an alert based on the investigation 358 for host configuration-related cyber threats. The alert can be sent to the cyber risk management provider or another party charged with managing the cyber assets of a particular tenant entity $1010_1$. In some aspects, the alert can comprise a message indicating, for example, an insecure host configuration has been detected, a computer using an insecure host configuration has been used to send or receive information, and/or a domain associated with a computer using an insecure host configuration has been communicated with. In some aspects, the alert can comprise instructions to take a specific action in response to the identified host configuration-related cyber threat.

Still referring to FIGS. 1, 4A and 4B, in various aspects, generating 360 one or more cyber risk mitigation actions can comprise generating a cyber threat database 354 based on the investigation 342 for host configuration-related cyber threats. The cyber threat database 354 can comprise a log of each of the domains from domain database 340 that has been identified as being exposed to a host configuration-related cyber threat. The cyber threat database 354 or portions thereof may be referenced by a security analyst of the cyber risk management provider or another party charged with managing the cyber assets of a particular tenant entity $1010_1$. For example, the cyber threat database can be used to identify domains associated with insecure host configurations that need to be updated.

Still referring to FIGS. 1, 4A and 4B, in various aspects, generating 360 one or more cyber risk mitigation actions can comprise generating a cyber security risk report 356 based on the investigation 342 for host configuration-related cyber threats. The cyber security risk report 356 can comprise an evaluation of the cyber threat exposure of the selected entity 302 (e.g., a tenant entity $1010_1$ or another entity $1010_2$, $1010_n$) based on the identified host configuration-related cyber threats.

Referring again primarily to FIGS. 4A and 4B, in various aspects, the domain database 340 can comprise domains that are associated with (e.g., that address or identify) computers that are owned, controlled, or otherwise used by the selected entity 302. These computers may attempt to send data to or receive data from malicious actors (e.g., groups or individuals with malicious intent such as accessing or destroying data). Thus, referring to FIG. 4B, the domain database 340 can be investigated 366 for traffic-related security threats. To investigate 366 for traffic-related security threats, data related to public discoveries of malicious actors 368 and/or data related to proprietary discoveries of malicious actors 370 can be searched to identify domains, IP addresses, modus operandi, or other indicators that can be used to identify a malicious actor. Then, cyber assets of the selected entity 302 (e.g., a domain in the domain database 340, a computer associated with a domain in the domain database 340) can be monitored for communications with the malicious actor.

To identify traffic-related cyber threats involving malicious inbound traffic, investigating 366 for traffic-related cyber threats can comprise identifying domains or IP addresses associated with malicious actors that are sending or attempting to send data to a domain in domain database 340. For example, an IP address "1.2.3.4" may be known to be associated with a malicious actor based on data related to public discoveries of malicious actors 368 and/or data related to proprietary discoveries of malicious actors 370. IP address "1.2.3.4" may be observed as requesting a DNS lookup for or attempting to connect to the IP address of the domain "ftp.example.com," an associated domain 322 in domain database 340. Based on this request, the associated domain 322 "ftp.example.com" and/or the selected entity 302 can be identified with some confidence as a potential target-of-interest of the malicious actor. If more interactions between "ftp.example.com" and IP address "1.2.3.4" are observed, then the likelihood that the domain "ftp.example.com" and/or the selected entity 302 is a potential target-of-interest may increase. As another example, network data, such as netflow logs or packet captures, may be used to observe temporally long Internet connections between a malicious actor's IP address and a computer associated with an associated domain 322, such as "payroll.example.com." Based on this network data, the associated domain 322 ("payroll.example.com") and/or the selected entity 302 can be identified with some confidence as a potential target-of-interest of a malicious actor.

To identify traffic-related cyber threats involving malicious outbound traffic, investigating 366 for traffic-related cyber threats can comprise identifying a computer associated with a domain in domain database 340 that is attempting to connect with domains or IP addresses associated with malicious actors. For example, the IP address of the domain "evilhackercontroller.com" may be known to be associated with a malicious actor based on data related to public discoveries of malicious actors 368 and/or data related to proprietary discoveries of malicious actors 370. A computer acting as a boundary DNS resolver that is linked to an associated domain 322, such as "dns.example.com," may be observed requesting the IP address of the domain "evilhackercontroller.com." Based on this request, the associated domain 322 "example.com" and/or the selected entity 302 can be identified with a high level of confidence as the target of a malicious actor.

Still referring to FIG. 4B, the method 300 can continue by generating 372 one or more cyber risk mitigation actions based on the identified traffic-related cyber threats. The various actions that can be generated 372 comprise, for example, automatically implementing 374 a remediated configuration, generating 376, generating a cyber threat database 354, and/or generating a cyber security risk report 356.

Referring again to FIGS. 1, 4A and 4B, in various aspects, generating 372 one or more cyber risk mitigation actions can comprise automatically implementing 374 a remediated host configuration based on the investigation 366 for traffic-related cyber threats. For example, as explained above, the selected entity 302 may be an entity $1010_1$ contracting with a cyber risk management provider (i.e., a tenant entity $1010_1$). The cyber risk management provider server 1002 may have write access to at least some of the tenant entity's $1010_1$ cyber assets $1012_1$, $1012_2$, ... $1012_n$, thereby enabling the cyber risk management provider to cause an update to a computer associated with a domain of the tenant entity $1010_1$. In response to identifying a domain associated with a computer that is the subject of a traffic-related cyber threat, the cyber risk management provider server 1002 may automatically generate instructions that are sent (e.g. via a network 1008) to a cyber asset 1012 of the tenant entity $1010_1$. The instructions can cause an automated update to the configuration of the computer associated with the targeted domain. The remediated configuration can comprise, for example, a termination of the connection or blocking an attempted connection between the targeted domain and the malicious actor.

Still referring to FIGS. 1, 4A and 4B, in various aspects, generating 372 one or more cyber risk mitigation actions can comprise generating 376 an alert based on the investigation 366 for traffic-related cyber threats. The alert can be sent to the cyber risk management provider or another party charged with managing the cyber assets of a particular tenant entity $1010_1$.

Still referring to FIGS. 1, 4A and 4B, in various aspects, generating 372 one or more cyber risk mitigation actions can comprise generating a cyber threat database 354 based on the investigation 366 for traffic-related cyber threats. The cyber threat database 354 can comprise a log of each of the domains from domain database 340 that has been identified as being exposed to a traffic-related cyber threat. The cyber threat database 354 or portions thereof may be referenced by a security analyst of the cyber risk management provider or another party charged with managing the cyber assets of a particular tenant entity $1010_1$. For example, the cyber threat database can be used to identify domains associated with insecure host configurations that need to be updated.

Still referring to FIGS. 1, 4A and 4B, in various aspects, generating 372 one or more cyber risk mitigation actions can comprise generating a cyber security risk report 356 based on the investigation 366 for traffic-related cyber threats. The cyber security risk report 356 can comprise an evaluation of the cyber threat exposure of the selected entity 302 (e.g., a tenant entity $1010_1$ or another entity $1010_2$, ... $1010_n$) based on the identified traffic-related cyber threats.

Referring again to FIGS. 4A and 4B, the non-routine method of generating an entity domain database by (i) identifying 310/discovering 328 candidate domains 312, 330 (i.e., potential domains 312 and/or known redirecting domains 330) based on public data 306A, 326A and/or proprietary data 306B, 326B, which may be implemented using machine learning and/or other statistical or related computational methods, and (ii) classifying 320 candidate domains 312, 330 as associated domains 322 by fetching 314 the candidate domains 312, 330 to retrieve domain routing information 316 can allow for the more accurate and complete identification of cyber assets owned or otherwise controlled by a selected entity 302. Additionally, this non-routine method performs a task at a scale that cannot be practically performed in the human mind—method 300 can discover 328 and fetch 314 millions of known redirecting domains 330 and classify 320 some of these domains as associated domains 322 based on the retrieved routing information 316. For example, tens of millions of known redirecting domains 330 can be discovered 328 and fetched 314 in order to classify 320 domains as associated domains 322 (in one example, 28 million known redirecting domains 330 were discovered 328 and fetched 314 as part of method 300). Moreover, the iterative way in which some aspects of method 300 repeatedly identifies 338 additional potential URLs 332—until no new known redirecting domains 330 are identified or until a computing threshold is satisfied—cannot practically be performed in the human mind. Yet further, the generation of the entity domain database 340 is integrated into a practical application by generating 344, 360, 372 one or more automated cyber risk mitigation actions (e.g., implementing remediated configurations 346, 362, 374, generating alerts 352, 364, 376, generating a cyber security risk report 356, and generating a cyber threat database 354).

Figure 6:
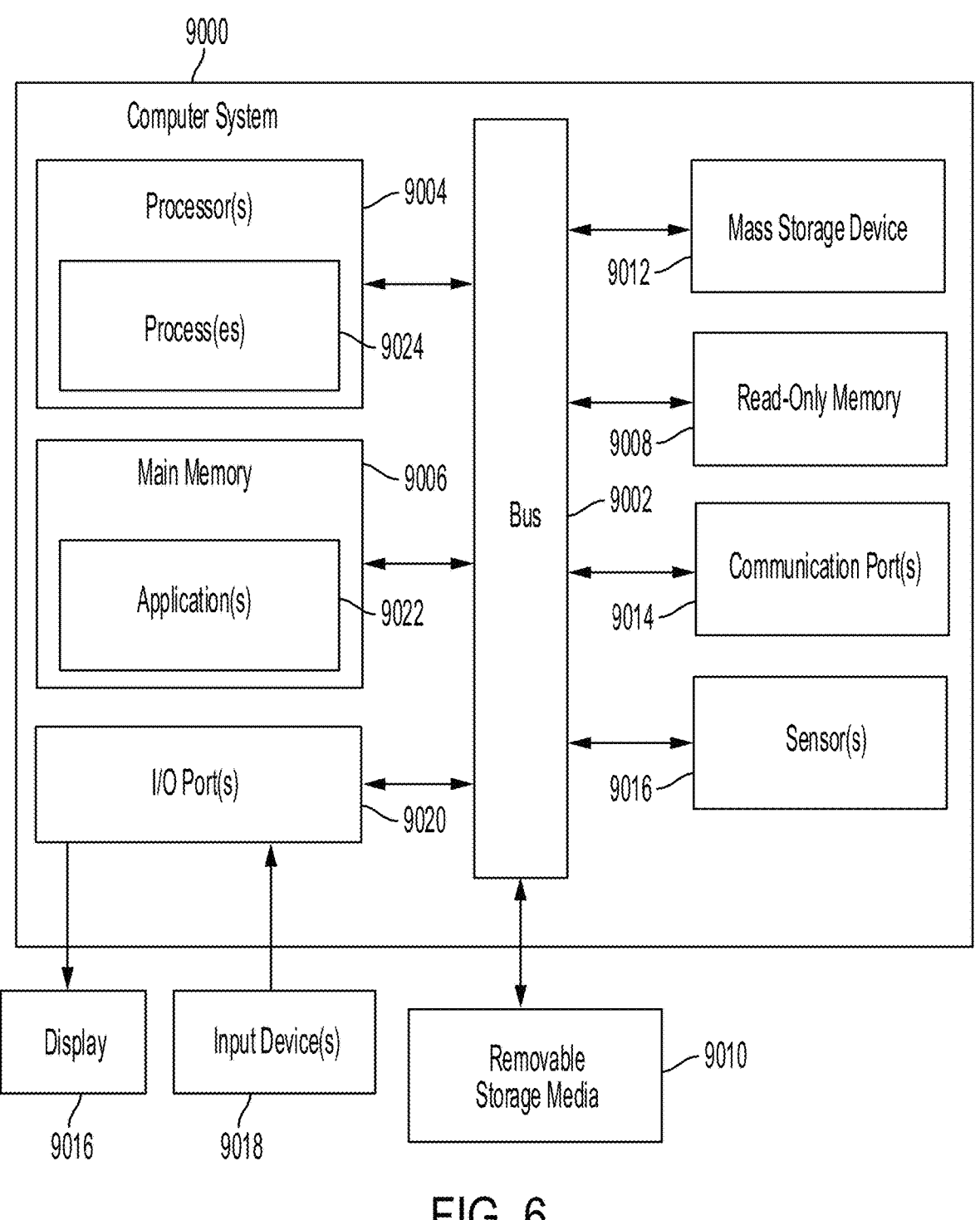
FIG. 6 illustrates a diagram of a computing system, in accordance with at least one non-limiting aspect of the present disclosure.

Referring now to FIG. 6, a diagram of a computer system 9000 is illustrated, in accordance with at least one non-limiting aspect of the present disclosure. The computer system 9000 and the various components comprised therein, as described below, may be used to implement various components of the system 1000 described hereinabove in connection with FIG. 1 and/or may be used to store and execute instructions for any of the various process described hereinabove in connection with FIGS. 2-4A and 4B.

According to the non-limiting aspect of FIG. 6, the computer system 9000 may include a bus 9002 (i.e., inter-connect), one or more processors 9004, a main memory 9006, read-only memory 9008, removable storage media 9010, mass storage 9012, and one or more communications ports 9014. As should be appreciated, components such as removable storage media are optional and are not necessary in all systems. Communication port 9014 may be connected to one or more networks by way of which the computer system 9000 may receive and/or transmit data.

As used herein, a "processor" can mean one or more microprocessors, central processing units (CPUs), comput-ing devices, microcontrollers, digital signal processors, graphics processing units (GPUs) or like devices or any combination thereof, regardless of their architecture. An apparatus that performs a process can include, e.g., a pro-cessor and those devices such as input devices and output devices that are appropriate to perform the process.

Processor(s) 9004 can be any known processor, such as, but not limited to, processors manufactured by and/or sold by INTEL®, AMD®, or MOTOROLA®, and the like, that are generally well-known to one skilled in the relevant art and are well-defined in the literature. Communications port(s) 9014 can be any of an RS-232 port for use with a modem based dial-up connection, a 10/100 Ethernet port, a Gigabit port using copper or fiber, or a USB port, and the like. Communications port(s) 9014 may be chosen depend-ing on a network such as a Local Area Network (LAN), a Wide Area Network (WAN), a CDN, or any network to which the computer system 9000 connects. The computer system 9000 may be in communication with peripheral devices (e.g., display screen 9016, input device(s) 9018) via Input/Output (I/O) port 9020.

Main memory 9006 can be Random Access Memory (RAM), or any other dynamic storage device(s) commonly known in the art. Read-only memory 9008 can be any static storage device(s) such as Programmable Read-Only Memory (PROM) chips for storing static information such as instructions for processor 9004. Mass storage 9012 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 9002 communicatively couples processor(s) 9004 with the other memory, storage, and communications blocks. Bus 9002 can be a PCI/PCI-X, SCSI, a Universal Serial Bus (USB) based system bus (or other) depending on the storage devices used, and the like. Removable storage media 9010 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Aspects described herein may be provided as one or more computer program products, which may include a machine-readable medium having stored thereon instructions, which may be used to program a computer (or other electronic devices) to perform a process. As used herein, the term "machine-readable medium" refers to any medium, a plu-rality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, cop-per wire and fiber optics, including the wires that comprise a system bus coupled to the processor. Transmission media may include or convey acoustic waves, light waves and electromagnetic emissions, such as those generated during radio frequency (RF) and infrared (IR) data communica-tions.

The machine-readable medium may include, but is not limited to, floppy diskettes, optical discs, CD-ROMs, mag-neto-optical disks, ROMs, RAMs, erasable programmable read-only memories (EPROMs), electrically erasable pro-grammable read-only memories (EEPROMs), magnetic or optical cards, flash memory, or other type of media/machine-readable medium suitable for storing electronic instructions. Moreover, aspects described herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 9006 is encoded with application(s) 9022 that supports the functionality discussed herein (the application 9022 may be an application that provides some or all of the functionality of the CD services described herein, including the client application). Application(s) 9022 (and/or other resources as described herein) can be embodied as software code such as data and/or logic instructions (e.g., code stored in the memory or on another computer readable medium such as a disk) that supports processing functionality according to different aspects described herein.

During operation of one aspect, processor(s) 9004 accesses main memory 9006 via the use of bus 9002 in order to launch, run, execute, interpret or otherwise perform the logic instructions of the application(s) 9022. Execution of application(s) 9022 produces processing functionality of the service related to the application(s). In other words, the process(es) 9024 represents one or more portions of the application(s) 9022 performing within or upon the processor(s) 9004 in the computer system 9000.

It should be noted that, in addition to the process(es) 9024 that carries (carry) out operations as discussed herein, other processes described herein include the application 9022 itself (i.e., the un-executed or non-performing logic instructions and/or data). The application 9022 may be stored on a computer readable medium (e.g., a repository) such as a disk or in an optical medium. According to other aspects, the application 9022 can also be stored in a memory type system such as in firmware, read only memory (ROM), or, as in this example, as executable code within the main memory 9006 (e.g., within Random Access Memory or RAM). For example, application 9022 may also be stored in removable storage media 9010, read-only memory 9008 and/or mass storage device 9012.

Those skilled in the art will understand that the computer system 9000 can include other processes and/or software and hardware components, such as an operating system that controls allocation and use of hardware resources.

Various aspects of the subject matter described herein are set out in the following numbered clauses:

Clause 1: A method for identifying cyber assets and implementing cyber risk mitigation actions comprising: selecting, by a processor, an entity for evaluation; identifying, by the processor, one or more seed domains of the entity; identifying, by the processor, candidate domains based on at least one of a public data source, a proprietary data source, or a combination thereof; fetching, by the processor, the candidate domains to determine routing information for each of the candidate domains; classifying, by the processor, based on the routing information, each candidate domain that redirects to the one or more seed domains as an associated domain, wherein each associated domain is considered to be an asset of entity; generating, by the processor, an entity asset database based on the one or more seed domains and the associated domains; generating, by the processor, a cyber risk mitigation action based on the entity asset database.

Clause 2: The method of clause 1 further comprising: investigating, by the processor, the entity asset database to identify associated domains linked to a device comprising an insecure host configuration; wherein generating a cyber risk mitigation action based on the entity asset database comprises at least one of: automatically implementing a remediated host configuration when a device comprising an insecure host configuration is identified; generating a security alert when an associated domain linked to a device comprising an insecure host configuration is identified; or generating a cyber security risk report based on the investigation of the entity asset database; or a combination thereof.

Clause 3: The method of any of clauses 1-2 further comprising: investigating, by the processor, the entity asset database to identify associated domains linked to a device communicating with a malicious actor; wherein generating a cyber risk mitigation action based on the entity asset database comprises at least one of: automatically implementing a remediated device communication configuration when communicating with a malicious actor is identified; generating a security alert when an associated domain linked to a device communicating with a malicious actor; is identified; or generating a cyber security risk report based on the investigation of the entity asset database; or a combination thereof.

Clause 4: The method of any of clauses 1-3 further comprising: investigating, by the processor, the entity asset database to identify associated domains comprising an email-related security threat; wherein the email-related security threat comprises an email configuration lacking an email authentication method and/or an email configuration with a misconfigured email authentication method; and wherein generating a cyber risk mitigation action based on the entity asset database comprises at least one of: automatically implementing a remediated email authentication configuration when an associated domain comprising an email-related security threat is identified; generating an automated label indicating that an email may not be authentic when received from an associated domain comprising an email-related security threat; quarantining an email when received from an associated domain comprising an email-related security threat; generating a security alert when an associated domain comprising an email-related security threat is identified; or generating a cyber security risk report based on the investigation of the entity asset database; or a combination thereof.

Clause 5: The method of any of clauses 1-4 further comprising: identifying, by the processor, based on the routing information, one or more candidate domains redirecting to one or more of the associated domains; and classifying, by the processor, each of the candidate domains that redirect to an associated domain as an associated domain.

Clause 6: The method of any of clauses 1-5 further comprising: identifying, by the processor, based on the routing information, one or more candidate domains redirecting to a subdomain of the one or more seed domains; and classifying, by the processor, each of the candidate domains that redirect to a subdomain of the one or seed domains as an associated domain.

Clause 7: The method of any of clauses 1-6 further comprising: identifying, by the processor, based on the routing information, one or more candidate domains redirecting to a subdomain of one or more of the associated domains; and classifying, by the processor, each of the candidate domains that redirect to a subdomain of one or more of the associated domains as an associated domains.

Clause 8: The method of any of clauses 1-7 wherein the candidate domains comprise potential domains, and wherein the potential domains are considered to be potential assets of the entity.

Clause 9: The method of any of clauses 1-8 wherein identifying candidate domains based on the at least one of a public data source, a proprietary data source, or a combination thereof public data source comprises: identifying potential domains based on at least one of an internet registration database, a public domain name system (DNS) database, a database comprising private and public DNS information, a public key certificate, a website, a government filing, or a combination thereof.

Clause 10: The method of any of clauses 1-9 wherein fetching the candidate domains to determine routing information for each of the candidate domains comprises determining at least one of intermediate hosting information, final hosting information, or a combination thereof.

Clause 11: The method of any of clauses 1-10 further comprising: fetching, by the processor, the candidate domains to determine if one or more candidate domain is inactive; and excluding, by the processor, a candidate domain from being classified as an associated domain if the candidate domain is inactive.

Clause 12: The method of any of clauses 1-11 further comprising: excluding, by the processor, a candidate domain from being classified as an associated domain if a uniform resource locator (URL) path of a domain that the candidate domain routes exceeds a path segment threshold.

Clause 13: The method of any of clauses 1-12 further comprising: excluding, by the processor, using machine learning, a candidate domain from being classified as an associated domain based on a uniform resource locator (URL) path of a domain that the candidate domain routes to.

Clause 14: The method of any of clauses 1-13, wherein identifying the candidate domains comprises discovering known redirecting domains.

Clause 15: The method of any of clauses 1-14, wherein identifying the candidate domains comprises: identifying potential uniform resource identifiers (URLs) based on at least one of a public data source, a proprietary data source, or a combination thereof; fetching the potential URLs to determine routing information for each of the URLs; and identifying, based on the URL routing information, one or more of the known redirecting domains.

Clause 16: The method of any of clauses 1-15, wherein identifying the candidate domains further comprises: identifying additional potential URLs based on the URL routing information; fetching the additional potential URLs to determine URL routing information for each of the additional potential URLs; and repeating the steps of identifying additional potential URLs and fetching the additional potential URLs until a computing threshold is satisfied or until no new known redirecting domains are identified.

Clause 17: A non-transitory computer readable storage medium comprising instructions, executable by a processor, to: select an entity for evaluation; identify one or more seed domains of the entity; identify candidate domains based on at least one of a public data source, a proprietary data source, or a combination thereof; fetch the candidate domains to determine routing information for each of the candidate domains; classify, based on the routing information, each candidate domain that redirects to the one or more seed domains as an associated domain, wherein each associated domain is considered to be an asset of entity; generate an entity asset database based on the one or more seed domains and the associated domains; generate a cyber risk mitigation action based on the entity asset database.

Clause 18: The non-transitory computer readable storage medium of clause 17 further comprising instructions, executable by the processor, to: investigate the entity asset database to identify associated domains linked to a device comprising an insecure host configuration; wherein the instructions to generate a cyber risk mitigation action based on the entity asset database comprise instructions to at least one of: automatically implement a remediated host configuration when a device comprising an insecure host configuration is identified; generate a security alert when an associated domains linked to a device comprising an insecure host configuration is identified; or generate a cyber security risk report based on the investigation of the entity asset database; or a combination thereof.

Clause 19: The non-transitory computer readable storage medium of any of clauses 17-18 further comprising instructions, executable by the processor, to: investigate the entity asset database to identify associated domains linked to a device communicating with a malicious actor; wherein the instructions to generate a cyber risk mitigation action based on the entity asset database comprise instructions to at least one of: automatically implement a remediated device communication configuration when communicating with a malicious actor is identified; generate a security alert when associated domain linked to a device communicating with a malicious actor; is identified; or generate a cyber security risk report based on the investigation of the entity asset database; or a combination thereof.

Clause 20: The non-transitory computer readable storage medium of any of clauses 17-19 further comprising instructions, executable by the processor, to: investigate the entity asset database to identify associated domains comprising an email-related security threat; wherein the email-related security threat comprises an email configuration lacking an email authentication method and/or an email configuration with a misconfigured email authentication method; and wherein the instructions to generate a cyber risk mitigation action based on the entity asset database comprise instructions to at least one of: automatically implement a remediated email authentication configuration when an associated domain comprising an email-related security threat is identified; generate an automated label indicating that an email may not be authentic when received from an associated domain comprising an email-related security threat; quarantine an email when received from an associated domain comprising an email-related security threat; generate a security alert when an associated domain comprising an email-related security threat is identified; or generate a cyber security risk report based on the investigation of the entity asset database; or a combination thereof.

Clause 21: The non-transitory computer readable storage medium of any of clauses 17-20 further comprising instructions, executable by the processor, to: identify, based on the routing information, one or more candidate domains redirecting to one or more of the associated domains; and classify each of the candidate domains that redirect to an associated domain as an associated domain.

Clause 22: The non-transitory computer readable storage medium of any of clauses 17-21 further comprising instructions, executable by the processor, to: identify, based on the routing information, one or more candidate domains redirecting to a subdomain of the one or more seed domains; and classify each of the candidate domains that redirect to a subdomain of the one or seed domains as an associated domain.

Clause 23: The non-transitory computer readable storage medium of any of clauses 17-22 further comprising instructions, executable by the processor, to: identify, based on the routing information, one or more candidate domains redirecting to a subdomain of one or more of the associated domains; and classify each of the candidate domains that redirect to a subdomain of one or more of the associated domains as an associated domain.

Clause 24: The non-transitory computer readable storage medium of any of clauses 17-23 wherein the candidate domains comprise potential domains, wherein the potential domains are considered to be potential assets of the entity.

Clause 25: The non-transitory computer readable storage medium of any of clauses 17-24, wherein identifying the candidate domains is executed using machine learning;

wherein the public data source comprises at least one internet registration database, public domain name system (DNS) database, public key certificate, website, or government filing; and wherein the proprietary data source comprises at least one private database comprising DNS transactions.

Clause 26: The non-transitory computer readable storage medium of any of clauses 17-25 wherein the routing information comprises at least one of intermediate hosting information, final hosting information, or a combination thereof.

Clause 27: The non-transitory computer readable storage medium of any of clauses 17-26 further comprising instructions, executable by the processor, to: fetch the candidate domains to determine if one or more candidate domain is inactive; exclude a candidate domain from being classified as an associated domain if the candidate domain is inactive.

Clause 28: The non-transitory computer readable storage medium of any of clauses 17-27 further comprising instructions, executable by the processor, to: exclude a candidate domain from being classified as an associated domain if a uniform resource locator (URL) path of a domain that the candidate domain routes exceeds a path segment threshold.

Clause 29: The non-transitory computer readable storage medium of any of clauses 17-28 further comprising instructions, executable by the processor, to: exclude a candidate domain from being classified as an associated domain based on a uniform resource locator (URL) path of a domain that the candidate domain routes to; wherein the excluding the candidate domain is executed using machine learning.

Clause 30: The non-transitory computer readable storage medium of any of clauses 17-29, wherein identifying the candidate domains comprises discovering known redirecting domains.

Clause 31: The non-transitory computer readable storage medium of any of clauses 17-30, wherein the instructions to identify the candidate domains comprise instructions to: identify potential uniform resource identifiers (URLs) based on at least one of a public data source, a proprietary data source, or a combination thereof: fetch the potential URLs to determine routing information for each of the URLs; identify, based on the URL routing information, one or more of the known redirecting domains.

Clause 32: The non-transitory computer readable storage medium of any of clauses 17-31, wherein the instructions to identify the candidate domains further comprise instructions to: identify additional potential URLs based on the URL routing information; fetch the additional potential URLs to determine URL routing information for each of the additional potential URLs; and repeat the steps of identifying additional potential URLs and fetching the additional potential URLs until a computing threshold is satisfied or until no new known redirecting domains are identified.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect.

Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all subranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A method for identifying cyber assets and implementing cyber risk mitigation actions comprising:
   selecting, by a processor, an entity for evaluation;
   identifying, by the processor, one or more seed domains of the entity;
   identifying, by the processor, candidate domains based on at least one of a public data source, a proprietary data source, or a combination thereof;
   fetching, by the processor, the candidate domains to determine routing information for each of the candidate domains;
   inferring, by the processor, based on the routing information, each candidate domain that redirects to the one or more seed domains as an associated domain, wherein each associated domain is considered to be an asset of entity;

generating, by the processor, an entity asset database based on the one or more seed domains and the associated domains; and generating, by the processor, a cyber risk mitigation action based on the entity asset database.

2. The method of claim 1, further comprising:

investigating, by the processor, the entity asset database to identify associated domains linked to a device comprising an insecure host configuration;

wherein generating a cyber risk mitigation action based on the entity asset database comprises at least one of:

automatically implementing a remediated host configuration when a device comprising an insecure host configuration is identified;

generating a security alert when an associated domain linked to a device comprising an insecure host configuration is identified; or generating a cyber security risk report based on the investigation of the entity asset database; or a combination thereof.

3. The method of claim 1, further comprising:

investigating, by the processor, the entity asset database to identify associated domains linked to a device communicating with a malicious actor;

wherein generating a cyber risk mitigation action based on the entity asset database comprises at least one of:

automatically implementing a remediated device communication configuration when communicating with a malicious actor is identified;

generating a security alert when an associated domain linked to a device communicating with a malicious actor is identified; or generating a cyber security risk report based on the investigation of the entity asset database; or a combination thereof.

4. The method of claim 1, further comprising:

investigating, by the processor, the entity asset database to identify associated domains comprising an email-related security threat;

wherein the email-related security threat comprises an email configuration lacking an email authentication method and/or an email configuration with a misconfigured email authentication method; and wherein generating a cyber risk mitigation action based on the entity asset database comprises at least one of:

automatically implementing a remediated email authentication configuration when an associated domain comprising an email-related security threat is identified;

generating an automated label indicating that an email may not be authentic when received from an associated domain comprising an email-related security threat;

quarantining an email when received from an associated domain comprising an email-related security threat;

generating a security alert when an associated domain comprising an email-related security threat is identified; or generating a cyber security risk report based on the investigation of the entity asset database; or a combination thereof.

5. The method of claim 1, further comprising:

identifying, by the processor, based on the routing information, one or more candidate domains redirecting to one or more of the associated domains; and classifying each of the candidate domains that redirect to an associated domain as an associated domain.

6. The method of claim 1, further comprising:

identifying, by the processor, based on the routing information, one or more candidate domains redirecting to a subdomain of the one or more seed domains; and classifying, by the processor, each of the candidate domains that redirect to a subdomain of the one or seed domains as an associated domain.

7. The method of claim 1, further comprising:

identifying, by the processor, based on the routing information, one or more candidate domains redirecting to a subdomain of one or more of the associated domains; and classifying, by the processor, each of the candidate domains that redirect to a subdomain of one or more of the associated domains as an associated domain.

8. The method of claim 1, wherein the candidate domains comprise potential domains, and wherein the potential domains are considered to be potential assets of the entity.

9. The method of claim 8, wherein identifying the candidate domains based on the at least one of a public data source, a proprietary data source, or a combination thereof public data source comprises:

identifying the potential domains based on at least one of an internet registration database, a public domain name system (DNS) database, a database comprising private and public DNS information, a public key certificate, a website, a government filing, or a combination thereof.

10. The method of claim 1 wherein fetching the candidate domains to determine routing information for each of the candidate domains comprises determining at least one of intermediate hosting information, final hosting information, or a combination thereof.

11. The method of claim 1, further comprising:

fetching, by the processor, the candidate domains to determine if one or more candidate domain is inactive; and excluding, by the processor, a candidate domain from being classified as an associated domain if the candidate domain is inactive.

12. The method of claim 1, further comprising:

excluding, by the processor, a candidate domain from being classified as an associated domain if a uniform resource locator (URL) path of a domain that the candidate domain routes exceeds a path segment threshold.

13. The method of claim 1, further comprising:

excluding, by the processor, using machine learning, a candidate domain from being classified as an associated domain based on a uniform resource locator (URL) path of a domain that the candidate domain routes to.

14. The method of claim 1, wherein identifying the candidate domains comprises discovering known redirecting domains.

15. The method of claim 14, wherein identifying the candidate domains comprises:

identifying potential uniform resource identifiers (URLs) based on at least one of a public data source, a proprietary data source, or a combination thereof;

fetching the potential URLs to determine routing information for each of the URLs; and identifying, based on the URL routing information, one or more of the known redirecting domains.

16. The method of claim 15, wherein identifying the candidate domains further comprises:

identifying additional potential URLs based on the URL routing information;

fetching the additional potential URLs to determine URL routing information for each of the additional potential URLs; and repeating the steps of identifying additional potential URLs and fetching the additional potential URLs until a computing threshold is satisfied or until no new known redirecting domains are identified.

17. A non-transitory computer readable storage medium comprising instructions, executable by a processor, to:

select an entity for evaluation;

identify one or more seed domains of the entity;

identify candidate domains based on at least one of a public data source, a proprietary data source, or a combination thereof;

fetch the candidate domains to determine routing information for each of the candidate domains;

infer, based on the routing information, each candidate domain that redirects to the one or more seed domains as an associated domain, wherein each associated domain is considered to be an asset of entity;

generate an entity asset database based on the one or more seed domains and the associated domains; and generate a cyber risk mitigation action based on the entity asset database.

18. The non-transitory computer readable storage medium of claim 17, further comprising instructions, executable by the processor, to:

investigate the entity asset database to identify associated domains linked to a device comprising an insecure host configuration;

wherein the instructions to generate a cyber risk mitigation action based on the entity asset database comprise instructions to at least one of:

automatically implement a remediated host configuration when a device comprising an insecure host configuration is identified;

generate a security alert when an associated domain linked to a device comprising an insecure host configuration is identified; or generate a cyber security risk report based on the investigation of the entity asset database;

or a combination thereof.

19. The non-transitory computer readable storage medium of claim 17, further comprising instructions, executable by the processor, to:

investigate the entity asset database to identify associated domains linked to a device communicating with a malicious actor;

wherein the instructions to generate a cyber risk mitigation action based on the entity asset database comprise instructions to at least one of:

automatically implement a remediated device communication configuration when communicating with a malicious actor is identified;

generate a security alert when an associated domain linked to a device communicating with a malicious actor; is identified; or generate a cyber security risk report based on the investigation of the entity asset database;

or a combination thereof.

20. The non-transitory computer readable storage medium of claim 17, further comprising instructions, executable by the processor, to:

investigate the entity asset database to identify associated domains comprising an email-related security threat;

wherein the email-related security threat comprises an email configuration lacking an email authentication method and/or an email configuration with a misconfigured email authentication method; and wherein the instructions to generate a cyber risk mitigation action based on the entity asset database comprise instructions to at least one of:

automatically implement a remediated email authentication configuration when an associated domain comprising an email-related security threat is identified;

generate an automated label indicating that an email may not be authentic when received from an associated domain comprising an email-related security threat;

quarantine an email when received from an associated domain comprising an email-related security threat;

generate a security alert when an associated domain comprising an email-related security threat is identified; or generate a cyber security risk report based on the investigation of the entity asset database;

or a combination thereof.

21. The non-transitory computer readable storage medium of claim 17, further comprising instructions, executable by the processor, to:

identify, based on the routing information, one or more candidate domains redirecting to one or more of the associated domains; and classify each of the candidate domains that redirect to an associated domain as an associated domain.

22. The non-transitory computer readable storage medium of claim 17, further comprising instructions, executable by the processor, to:

identify, based on the routing information, one or more candidate domains redirecting to a subdomain of the one or more seed domains; and classify each of the candidate domains that redirect to a subdomain of the one or seed domains as an associated domain.

23. The non-transitory computer readable storage medium of claim 17, further comprising instructions, executable by the processor, to:

identify, based on the routing information, one or more candidate domains redirecting to a subdomain of one or more of the associated domains; and classify each of the candidate domains that redirect to a subdomain of one or more of the associated domains as an associated domain.

24. The non-transitory computer readable storage medium of claim 17, wherein the candidate domains comprise potential domains, wherein the potential domains are considered to be potential assets of the entity.

25. The non-transitory computer readable storage medium of claim 24, wherein identifying the candidate domains is executed using machine learning;

wherein the public data source comprises at least one internet registration database, public domain name system (DNS) database, public key certificate, website, or government filing; and wherein the proprietary data source comprises at least one private database comprising DNS transactions.

26. The non-transitory computer readable storage medium of claim 17, wherein the routing information comprises at least one of intermediate hosting information, final hosting information, or a combination thereof.

27. The non-transitory computer readable storage medium of claim 17, further comprising instructions, executable by the processor, to:

fetch the candidate domains to determine if one or more candidate domain is inactive; and exclude a candidate domain from being classified as an associated domain if the candidate domain is inactive.

28. The non-transitory computer readable storage medium of claim 17, further comprising instructions, executable by the processor, to:

exclude a candidate domain from being classified as an associated domain if a uniform resource locator (URL) path of a domain that the candidate domain routes exceeds a path segment threshold.

29. The non-transitory computer readable storage medium of claim 17, further comprising instructions, executable by the processor, to:

exclude a candidate domain from being classified as an associated domain based on a uniform resource locator (URL) path of a domain that the candidate domain routes to;

wherein the excluding the candidate domain is executed using machine learning.

30. The non-transitory computer readable storage medium of claim 17, wherein identifying the candidate domains comprises discovering known redirecting domains.

31. The non-transitory computer readable storage medium of claim 30 wherein the instructions to identify the candidate domains comprise instructions to:

identify potential uniform resource identifiers (URLs) based on at least one of a public data source, a proprietary data source, or a combination thereof:

fetch the potential URLs to determine routing information for each of the URLs; and identify, based on the URL routing information, one or more of the known redirecting domains.

32. The non-transitory computer readable storage medium of claim 31, wherein the instructions to identify the candidate domains further comprise instructions to:

identify additional potential URLs based on the URL routing information;

fetch the additional potential URLs to determine URL routing information for each of the additional potential URLs; and repeat the steps of identifying additional potential URLs and fetching the additional potential URLs until a computing threshold is satisfied or until no new known redirecting domains are identified.

\* \* \* \* \*